United States Patent
Akiyama et al.

(10) Patent No.: US 12,247,768 B2
(45) Date of Patent: Mar. 11, 2025

(54) ELECTROCALORIC EFFECT ELEMENT, HEAT TRANSFER DEVICE, SEMICONDUCTOR MANUFACTURING DEVICE, AND ELECTROCALORIC EFFECT ELEMENT CONTROL METHOD

(71) Applicant: Tokyo Electron Limited, Tokyo (JP)

(72) Inventors: Koji Akiyama, Yamanashi (JP);
Hiroyuki Nagai, Yamanashi (JP);
Mitsuaki Iwashita, Yamanashi (JP);
Hirokazu Ueda, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 351 days.

(21) Appl. No.: 17/907,699

(22) PCT Filed: Aug. 12, 2021

(86) PCT No.: PCT/JP2021/029761
§ 371 (c)(1),
(2) Date: Sep. 29, 2022

(87) PCT Pub. No.: WO2022/044835
PCT Pub. Date: Mar. 3, 2022

(65) Prior Publication Data
US 2023/0135523 A1 May 4, 2023

(30) Foreign Application Priority Data
Aug. 26, 2020 (JP) .................................. 2020-142661

(51) Int. Cl.
F25B 21/02 (2006.01)
F25B 49/00 (2006.01)

(52) U.S. Cl.
CPC .............. *F25B 21/02* (2013.01); *F25B 49/00* (2013.01)

(58) Field of Classification Search
None
See application file for complete search history.

(56) References Cited

U.S. PATENT DOCUMENTS

| | | | | |
|---|---|---|---|---|
| 8,695,353 | B2 * | 4/2014 | Casasanta | F25B 21/00 62/3.1 |
| 9,109,818 | B2 * | 8/2015 | Schwartz | F25B 21/00 |
| 9,157,669 | B2 * | 10/2015 | Kruglick | H10N 15/10 |
| 9,310,109 | B2 * | 4/2016 | Kruglick | F25B 21/00 |
| 11,320,178 | B2 * | 5/2022 | Haseba | F25B 21/00 |
| 11,397,031 | B2 * | 7/2022 | Pei | H10N 15/15 |

(Continued)

FOREIGN PATENT DOCUMENTS

| | | | | |
|---|---|---|---|---|
| WO | WO-2017111918 A1 | * | 6/2017 | B60H 1/32 |
| WO | WO-2018232394 A1 | * | 12/2018 | C08F 18/20 |

OTHER PUBLICATIONS

Rujun Ma et al., "Highly efficient electrocaloric cooling with electrostatic actuation", Science 357, 1130-1134 (2017) Sep. 15, 2017.

*Primary Examiner* — Jenna M Maroney
(74) *Attorney, Agent, or Firm* — IPUSA, PLLC

(57) ABSTRACT

An electrocaloric effect element includes a container having a first wall and a second wall, the second wall facing the first wall, ionic liquid accommodated in the container, a first electrode provided at an outer surface of the first wall, and a movable electrode provided in the ionic liquid such that the movable electrode is movable in the ionic liquid.

17 Claims, 21 Drawing Sheets

(56) References Cited

U.S. PATENT DOCUMENTS

| | | | |
|---|---|---|---|
| 11,635,235 B2* | 4/2023 | Pei | F25B 21/00 |
| | | | 62/3.1 |
| 11,933,524 B2* | 3/2024 | Pei | F25B 21/00 |
| 12,044,448 B2* | 7/2024 | Lee | H03K 17/687 |
| 2011/0146308 A1* | 6/2011 | Casasanta | F25B 21/00 |
| | | | 62/113 |
| 2018/0164001 A1* | 6/2018 | Schwartz | F25B 21/00 |
| 2020/0309420 A1* | 10/2020 | Haseba | H01H 71/14 |

* cited by examiner

ELECTROCALORIC EFFECT ELEMENT, HEAT TRANSFER DEVICE, SEMICONDUCTOR MANUFACTURING DEVICE, AND ELECTROCALORIC EFFECT ELEMENT CONTROL METHOD

TECHNICAL FIELD

The present disclosure relates to an electrocaloric effect element, a heat transfer device, a semiconductor manufacturing device, and a method of controlling the electrocaloric effect element.

BACKGROUND

As a cooling device, electrocaloric effect elements using ferroelectric materials have been proposed (Non-Patent Document 1).

CITATION LIST

Non-Patent Document

[Non-Patent Document 1] Ma et al., Science 357, 1130-1134 (2017)

SUMMARY

Problem to be Solved by the Invention

The present disclosure provides an electrocaloric effect element, a heat transfer device, a semiconductor manufacturing device, and a method of controlling the electrocaloric effect element that can improve the efficiency of the heat transfer.

Means for Solving Problem

An electrocaloric effect element according to one aspect of the present disclosure includes a container having a first wall, an ionic liquid contained in the container, a first electrode disposed at an outer surface of the first wall, and a movable electrode disposed in the ionic liquid such that the movable electrode is movable in the ionic liquid.

Effect of Invention

According to the present disclosure, the efficiency of the heat transfer can be improved.

DESCRIPTION OF EMBODIMENTS

Figure 1:
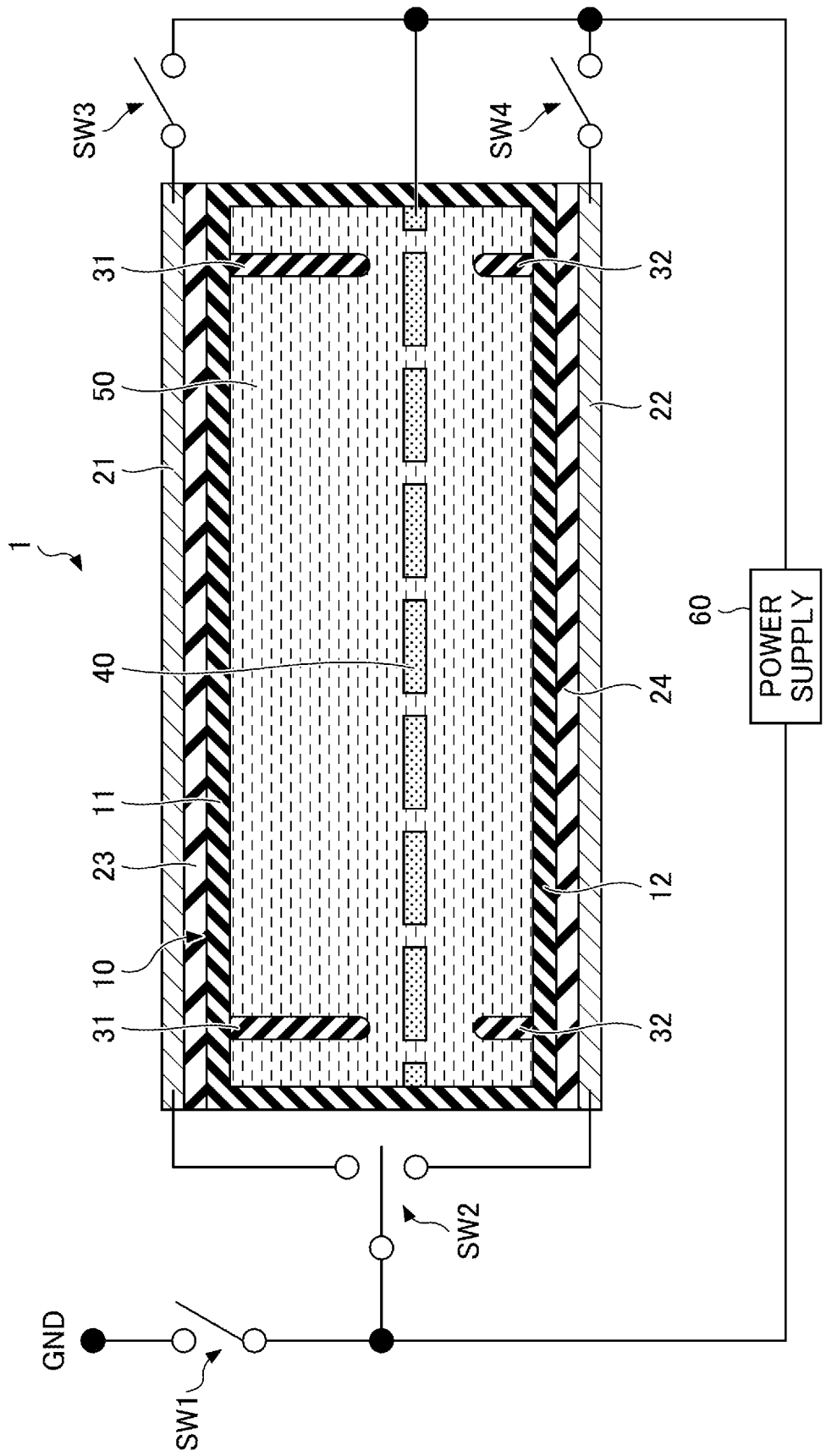
FIG. 1 is a schematic diagram illustrating an electrocaloric effect element according to a first embodiment.

In the following, embodiments will be specifically described with reference to the accompanying drawings. In the present specification and the drawings, components having substantially the same functional structure may be referenced by the same reference numerals and the overlapped description may be omitted.

First Embodiment

The first embodiment relates to an electrocaloric effect element suitable for cooling. FIG. 1 is a schematic diagram illustrating an electrocaloric effect element according to a first embodiment.

The electrocaloric effect element 1 according to the first embodiment includes a container 10, a first electrode 21, a second electrode 22, a first insulating film 23, a second insulating film 24, an ionic liquid 50, a movable electrode 40, a first spacer 31, and a second spacer 32, as illustrated in FIG. 1.

The container 10 has a first wall 11 and a second wall 12 facing the first wall 11. The container 10 is, for example, an insulating container. The container 10 is preferably flexible. The shape of the container 10 is not limited, but the container 10 may be, for example, in the form of a plate or a film. That is, the area of the first wall 11 and the second wall 12 is significantly greater than the distance between the first wall 11 and the second wall 12.

The first electrode 21 is provided at the outer surface of the first wall 11. The second electrode 22 is provided at the outer surface of the second wall 12. The first electrode 21 and the second electrode 22 include a conductive oxide, such as indium tin oxide (ITO), for example. The first electrode 21 and the second electrode 22 are arranged parallel to each other. The distance between the first electrode 21 and the second electrode 22 is, for example, 100 μm or less.

The first insulating film 23 is provided between the first wall 11 and the first electrode 21. The second insulating film 24 is provided between the second wall 12 and the second electrode 22. The first insulating film 23 and the second insulating film 24 include, for example, silicon oxide ($SiO_2$), aluminum oxide ($Al_2O_3$), silicon nitride (SiN), zirconium oxide ($ZrO_2$), hafnium oxide ($HfO_2$), titanium oxide ($TiO_2$), strontium titanate (STO), barium titanate (BTO), lead zirconate titanate (PZT), or calcium copper titanate (CCTO).

The ionic liquid 50 is contained in the container 10. The ionic liquid 50 is liquid including cations and anions, and includes cation-anion pairs. When an electric field is not applied between the first electrode 21 and the second electrode 22, the orientations of the cation-anion pairs are randomly aligned, and when an electric field is applied between the first electrode 21 and the second electrode 22, the orientations of the cation-anion pairs are aligned in a direction corresponding to the direction of the electric field. The entropy calculated when the orientations are randomly aligned is greater than the entropy calculated when the orientations are aligned, and the temperature observed when the orientations are randomly aligned is lower than when the temperature observed when the orientations are aligned. Thus, the ionic liquid 50 exhibits the electrocaloric effect, similarly with the ferroelectric.

Figure 2:
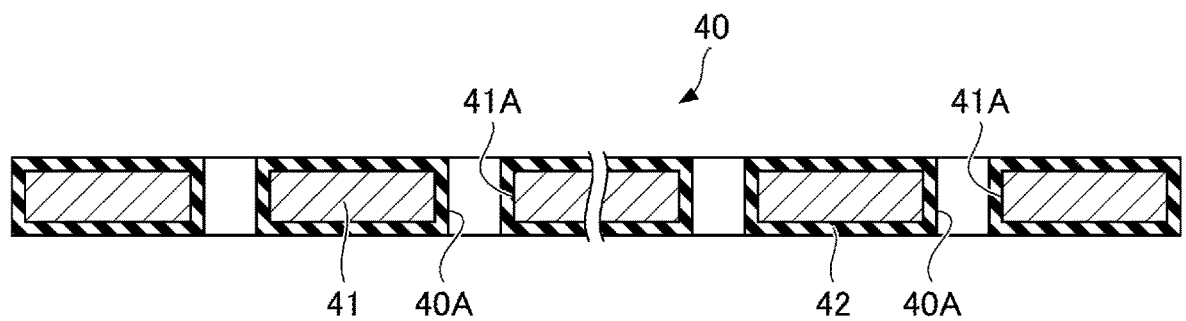
FIG. 2 is a cross-sectional view illustrating a movable electrode.

The movable electrode 40 is provided in the ionic liquid such that the movable electrode 40 is movable in the ionic liquid 50. The movable electrode 40 is a plate electrode disposed, parallel to the first electrode 21 and the second electrode 22, in the ionic liquid 50. FIG. 2 is a cross-sectional view illustrating the movable electrode. As illustrated in FIG. 2, the movable electrode 40 includes a conductive base material 41. The base material 41 is formed as a plate. Multiple openings 41A are formed in the base material 41. An insulating film 42 covering the surface of the base material 41 is formed. The insulating film 42 also covers the inner wall surface of the opening 41A. The movable electrode 40 has an opening 40A, having the insulating film 42 as sidewalls, inside the opening 41A. The insulating film 42 includes, for example, silicon oxide, aluminum oxide, silicon nitride, zirconium oxide, hafnium oxide, titanium oxide, strontium titanate, barium titanate, lead zirconate titanate, or calcium copper titanate.

The first spacer 31 is provided on the inner surface of the first wall 11 and prevents the movable electrode 40 from contacting the first wall 11. The second spacer 32 is provided on the inner surface of the second wall 12 and prevents the movable electrode 40 from contacting the second wall 12.

The first spacer 31 and the second spacer 32 are, for example, composed of insulators. In the first embodiment, the first spacer 31 is higher than the second spacer 32.

As illustrated in FIG. 1, the electrocaloric effect element 1 is used while connected to a direct current power supply 60. The negative electrode of the power supply 60 is connected to a ground terminal GND via a switch SW1. A node is provided between the negative electrode of the power supply 60 and the switch SW1, and a switch SW2 is provided to switch between the first electrode 21 and the second electrode 22 as the connection destination of the node. The positive electrode of the power supply 60 is connected to the base material 41 of the movable electrode 40. The positive electrode of the power supply 60 is connected to the first electrode 21 via a switch SW3 and is connected to the second electrode 22 via a switch SW4.

Figure 3:
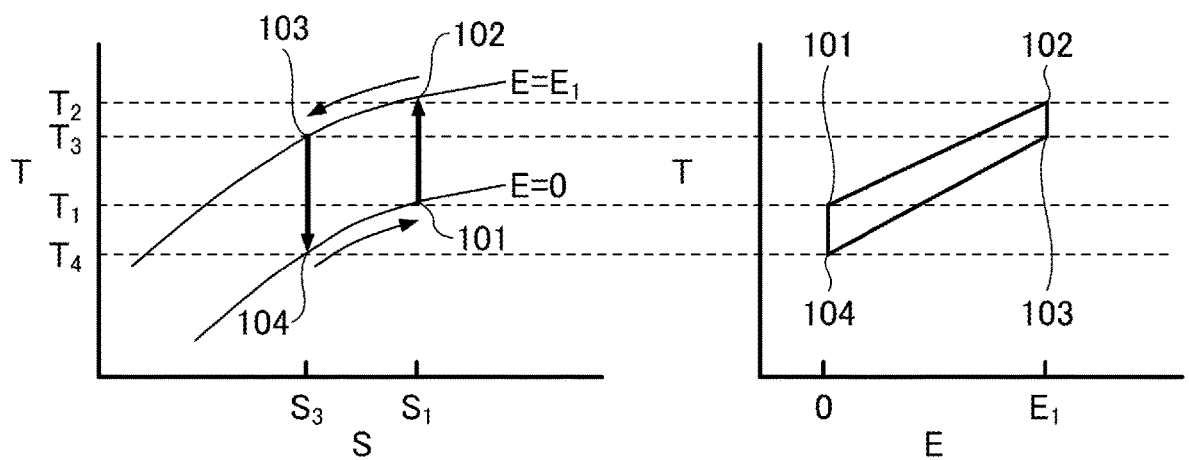
FIG. 3 is graphs indicating the thermodynamic cycle of ionic liquid.

Here, the characteristic of the ionic liquid 50 will be described. FIG. 3 is graphs indicating the thermodynamic cycle of the ionic liquid 50. FIG. 3 indicates the relationship between the entropy S and the temperature T on the left side, and indicates the relationship between the electric field strength E and the temperature T on the right side.

In a first state 101, an electric field is not applied, the electric field strength E is 0, the entropy S is S1, and the temperature T is T1. In the first state 101, the orientations of the cation-anion pairs are randomly aligned.

Subsequently, when an electric field having an electric field strength E of $E_1$ is applied, the state transitions to a second state 102. When the electric field strength E becomes $E_1$, the temperature T increases rapidly to temperature $T_2$, but the orientations of the cation-anion pairs remain randomly aligned, and the entropy S remains S1.

When the application of the electric field having an electric field strength E of $E_1$ is maintained, as time passes, the orientations of the cation-anion pairs change such that the orientations are aligned with the direction of the electric field having an electric field strength E of $E_1$, and the state transitions to a third state 103. During the transition from the second state 102 to the third state 103, the entropy S decreases from $S_1$ to $S_3$ and the temperature T decreases from $T_2$ to $T_3$. A decrease in the temperature of the ionic liquid 50 indicates that the heat retained in the ionic liquid 50 is released.

Subsequently, when the application of the electric field is stopped, the state transitions to a fourth state 104. When the electric field strength E becomes 0, the temperature T decreases rapidly to temperature $T_4$, but the orientations of the cation-anion pairs remain aligned, and the entropy S remains $S_3$.

When the state in which the application of the electric field is stopped is maintained, as time passes, the orientations of the cation-anion pairs become randomly aligned and the state transitions to the first state 101. During the transition from the fourth state 104 to the first state 101, the entropy S increases from $S_3$ to $S_1$, and the temperature T increases from $T_4$ to $T_1$. An increase in the temperature of the ionic liquid 50 indicates that external heat is absorbed by the ionic liquid 50.

The ionic liquid 50 has the characteristic described above.

Then, the electrocaloric effect element 1 according to the first embodiment operates as follows by utilizing such a characteristic. FIGS. 4 to 10 are diagrams illustrating a cooling operation of the electrocaloric effect element 1 according to the first embodiment. This operation is achieved, for example, by a control mechanism, such as a computer, executing a control program. In FIGS. 4 to 10, the arrows in the ionic liquid 50 indicate the orientations of the cation-anion pairs. As illustrated in FIGS. 4 to 10, a heat source 72 to be cooled is provided on the second electrode 22 side and a heat sink 71 is provided on the first electrode 21 side.

Figure 4:
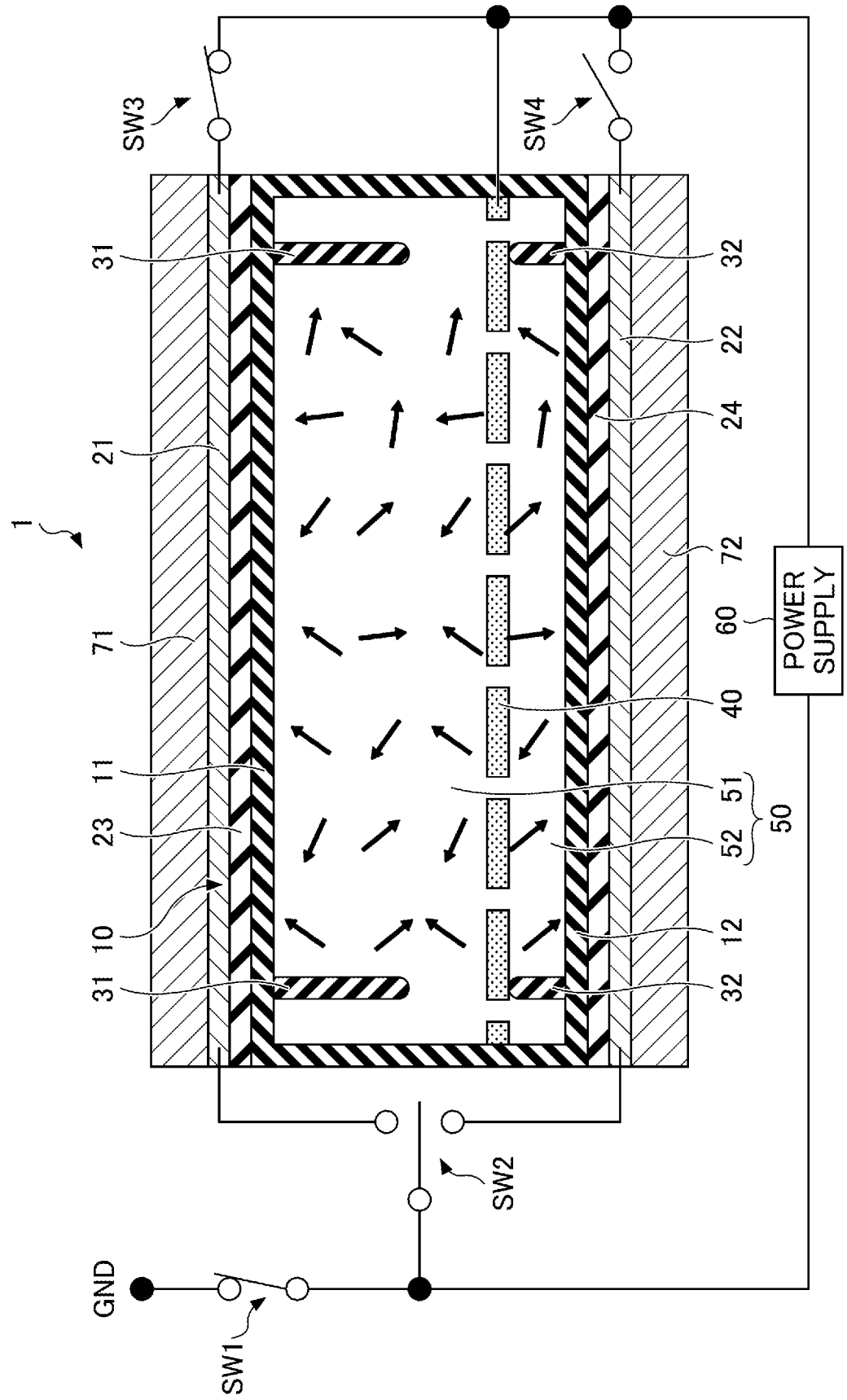
FIG. 4 is a first diagram illustrating a cooling operation of the electrocaloric effect element according to the first embodiment.

First, as illustrated in FIG. 4, the switches SW1 and SW3 are closed, and the switches SW2 and SW4 are opened. Because the identical electric potential is applied to the first electrode 21 and the movable electrode 40, the electric field strength E between the first electrode 21 and the movable electrode 40 is 0. Additionally, a repulsion force acts between the first electrode 21 and the movable electrode 40, and the movable electrode 40 approaches the second electrode 22, contacts the second spacer 32, and stops. The potential of the second electrode 22 is floating and no electric field is applied between the second electrode 22 and the movable electrode 40. In FIG. 4, all of the ionic liquid 50 is in the first state 101. The entropy S is $S_1$ and the temperature T is $T_1$.

Figure 5:
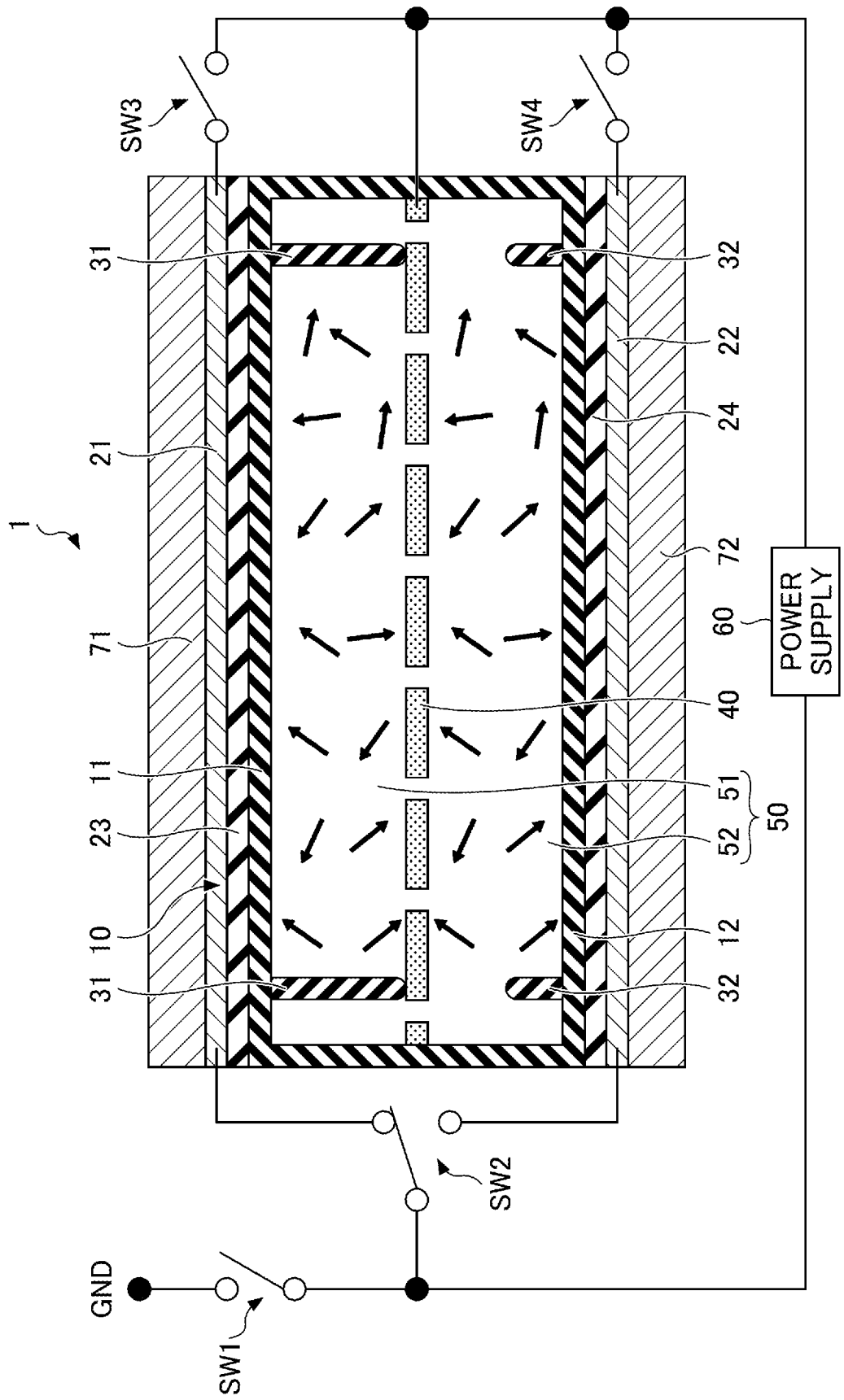
FIG. 5 is a second diagram illustrating the cooling operation of the electrocaloric effect element according to the first embodiment.

Subsequently, as illustrated in FIG. 5, the switches SW1, SW3, and SW4 are opened, and the switch SW2 is connected to the first electrode 21 side. Because a voltage of the power supply 60 is applied between the first electrode 21 and the movable electrode 40, an electric field having an electric field strength E of $E_1$ is applied between the first electrode 21 and the movable electrode 40. Additionally, an attractive force acts between the first electrode 21 and the movable electrode 40, and the movable electrode 40 approaches the first electrode 21, contacts the first spacer 31, and stops. At this time, the ionic liquid 50 is agitated through the opening 40A. Therefore, heat transferred from the heat source 72 to the ionic liquid 50 is transferred from the ionic liquid 50 to the heat sink 71, and is released to the outside from the heat sink 71. A first portion 51 between the movable electrode 40 and the first electrode 21 in the ionic liquid 50 is in the second state 102. That is, the entropy S remains $S_1$ and the temperature T increases to $T_2$. In contrast, a second portion 52 between the movable electrode 40 and the second electrode 22 in the ionic liquid 50 remains in the first state 101.

Figure 6:
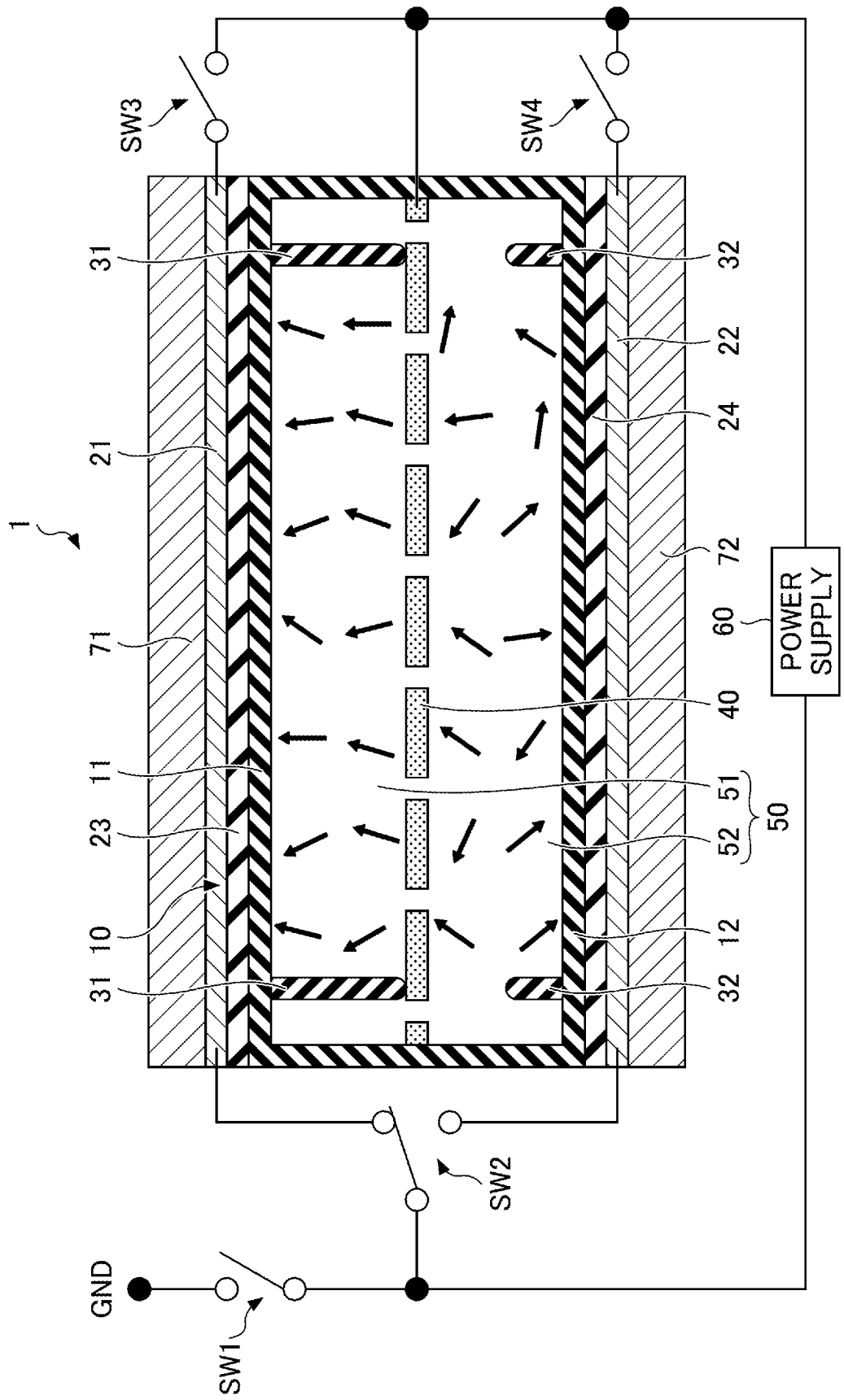
FIG. 6 is a third diagram illustrating the cooling operation of the electrocaloric effect element according to the first embodiment.

When the state of the switches SW1 to SW4 illustrated in FIG. 5 is maintained, as illustrated in FIG. 6, as time passes, the orientations of the cation-anion pairs change in the first portion 51 such that the orientations are aligned with the direction of the electric field having an electric field strength E of $E_1$. That is, the first portion 51 changes from the second state 102 to the third state 103. At this time, the entropy S decreases from $S_1$ to $S_3$ and the temperature T decreases from $T_2$ to $T_3$. Therefore, the heat is released from the first portion 51 to the heat sink 71. Additionally, the second portion 52 remains in the first state 101, but as the temperature of the first portion 51 decreases, the temperature difference between the first portion 51 and the heat source 72 increases, and the heat of the heat source 72 is transferred to the first portion 51 through the second portion 52.

Figure 7:
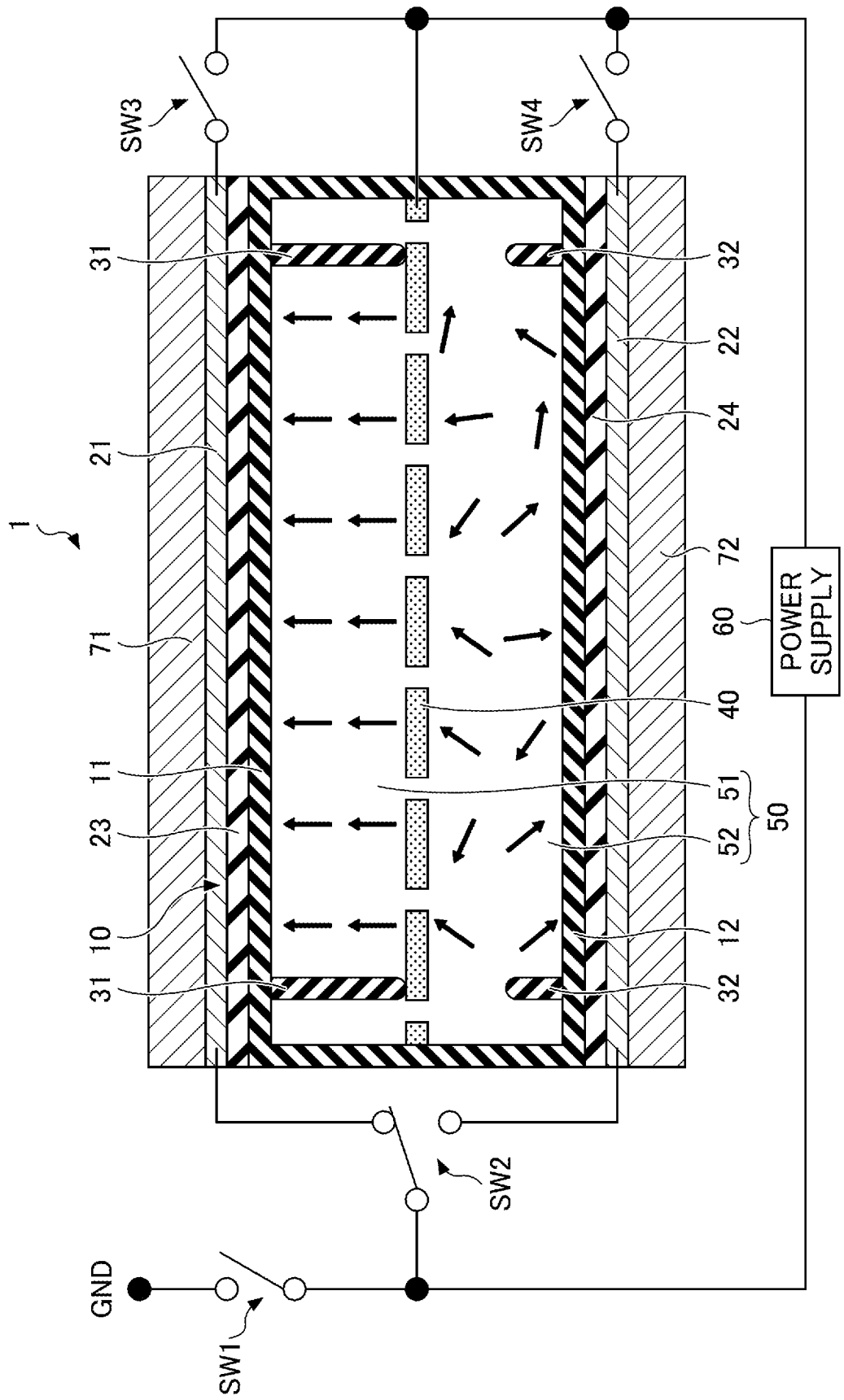
FIG. 7 is a fourth diagram illustrating the cooling operation of the electrocaloric effect element according to the first embodiment.

As time passes further, as illustrated in FIG. 7, the orientations of the cation-anion pairs in the first portion 51 are aligned in one direction, and the first portion 51 reaches the third state 103. In the first portion 51, the entropy S reaches $S_3$ and the temperature T reaches $T_3$. The second portion 52 remains in the first state 101, but as the temperature of the first portion 51 decreases, the temperature difference between the first portion 51 and the heat source 72 increases, and the heat of the heat source 72 is transferred to the first portion 51 through the second portion 52.

Figure 8:
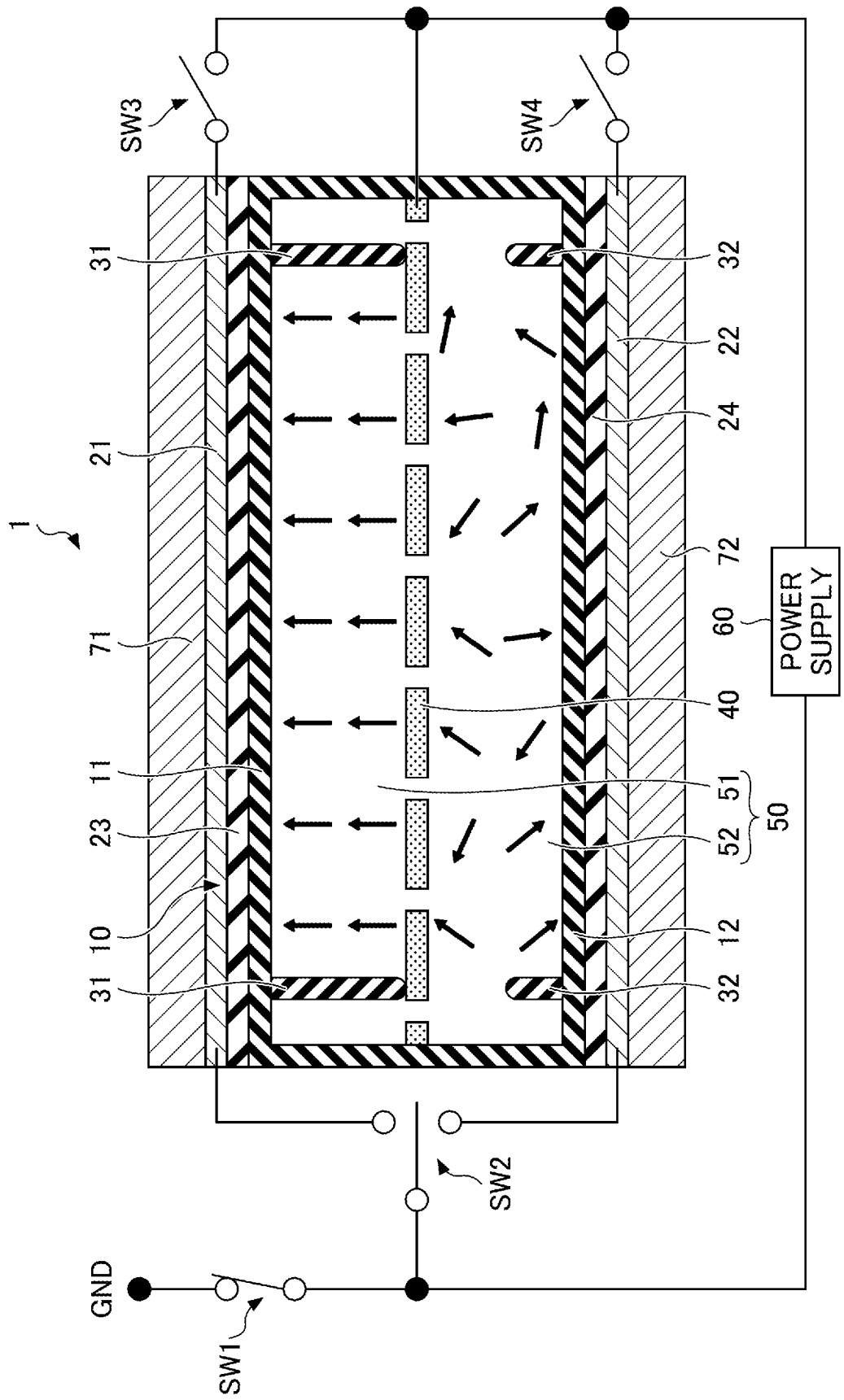
FIG. 8 is a fifth diagram illustrating the cooling operation of the electrocaloric effect element according to the first embodiment.

Subsequently, as illustrated in FIG. 8, the switch SW1 is closed and the switches SW2, SW3 and SW4 are opened. Because the potentials of the first electrode 21, the second electrode 22, and the movable electrode 40 are floating, the electric field strength E of the electric field between the first electrode 21 and the movable electrode 40 and the electric field strength E between the second electrode 22 and the movable electrode 40 are both 0. The first portion 51 is in the fourth state 104. That is, the entropy S remains $S_3$ and the temperature T decreases to $T_4$. The second portion 52 remains in the first state 101, but the heat of the heat source 72 is transferred to the first portion 51 through the second portion 52.

Figure 9:
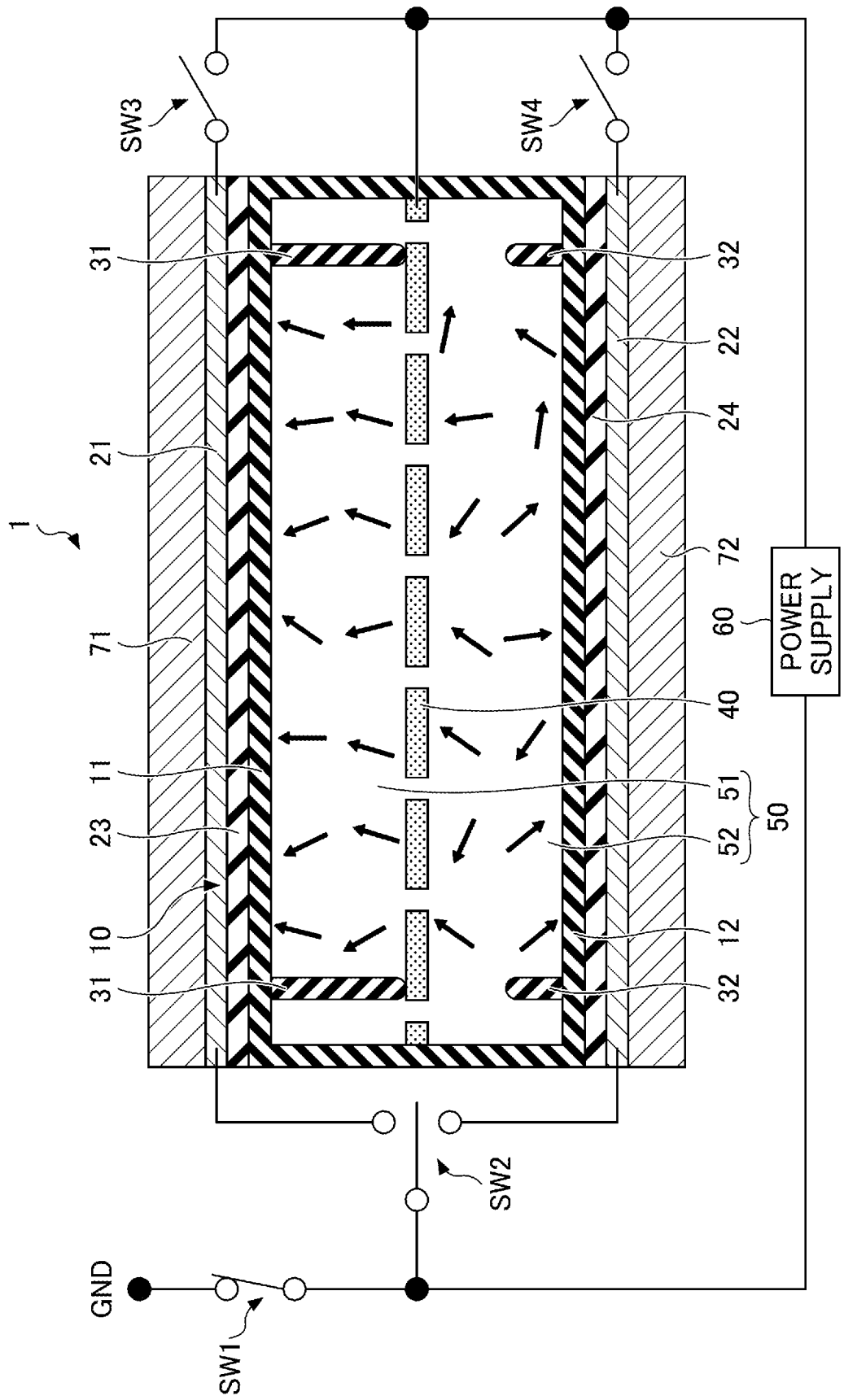
FIG. 9 is a sixth diagram illustrating the cooling operation of the electrocaloric effect element according to the first embodiment.

When the state of the switches SW1 to SW4 illustrated in FIG. 8 is maintained, as illustrated in FIG. 9, as time passes, the first portion 51 absorbs the heat from the second portion 52 and, in the first portion 51, the orientations of the cation-anion pairs change to be randomly aligned. That is, the first portion 51 changes from the fourth state 104 to the first state 101. At this time, the entropy S increases from $S_3$ to $S_1$, and the temperature T increases from $T_4$ to $T_1$. The second portion 52 remains in the first state 101, but absorbs the heat from the heat source 72 because the heat is absorbed by the first portion 51.

As time passes further, the orientations of the cation-anion pairs become randomly aligned in the first portion 51, and the first portion 51 reaches the first state 101. In the first portion 51, the entropy S reaches $S_1$ and the temperature T reaches $T_1$. The second portion 52 remains in the first state 101, but the heat of the heat source 72 is transferred to the first portion 51 through the second portion 52.

Figure 10:
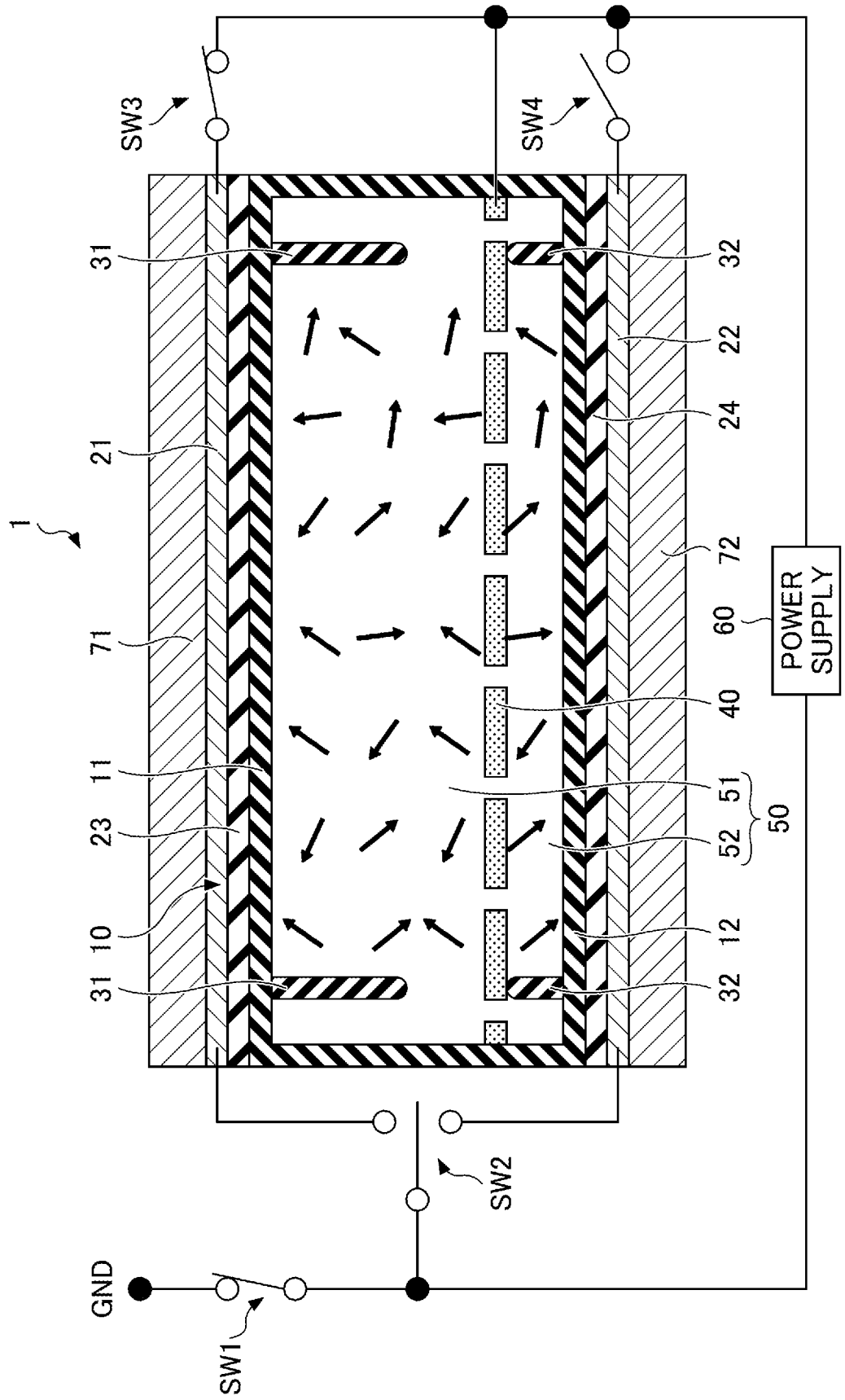
FIG. 10 is a seventh diagram illustrating the cooling operation of the electrocaloric effect element according to the first embodiment.

Subsequently, as illustrated in FIG. 10, the switches SW1 and SW3 are closed, and the switches SW2 and SW4 are opened. Because the identical electric potential is applied to the first electrode 21 and the movable electrode 40, the electric field strength E of the electric field between the first electrode 21 and the movable electrode 40 is 0. Additionally, a repulsion force acts between the first electrode 21 and the movable electrode 40, and the movable electrode 40 approaches the second electrode 22, contacts the second spacer 32, and stops. At this time, the ionic liquid 50 is agitated through the opening 40A. Therefore, the heat transferred from the heat source 72 to the ionic liquid 50 is transferred from the ionic liquid 50 to the heat sink 71, and is released to the outside from the heat sink 71. As described, the state is returned to the state illustrated in FIG. 4.

As these cycles are repeated, the heat generated by the heat source 72 is transferred to the heat sink 71 by the electrocaloric effect element 1.

According to the first embodiment, because the specific heat of the ionic liquid 50 is smaller than the specific heat of the ferroelectric material, the heat is transferred through the ionic liquid 50 itself in addition to the electrocaloric effect. Thus, the heat can be transferred efficiently and the heat source 72 can be cooled efficiently.

Additionally, if the movable electrode can move in the ionic liquid 50 having fluidity, the heat transfer is performed without deformation of the movable electrode 40. Therefore, even if the shape of the electrocaloric effect element 1 is complicated, excellent heat transfer efficiency can be easily obtained. Additionally, the size of the electrocaloric effect element 1 can be diversified. For example, the size may be suitable for cooling smartphones or suitable for heating and cooling in buildings.

Further, with the electrocaloric effect element 1 having flexibility, the electrocaloric effect element 1 can be easily adhered to the heat source 72, and the heat can be transferred more efficiently.

Figure 11:
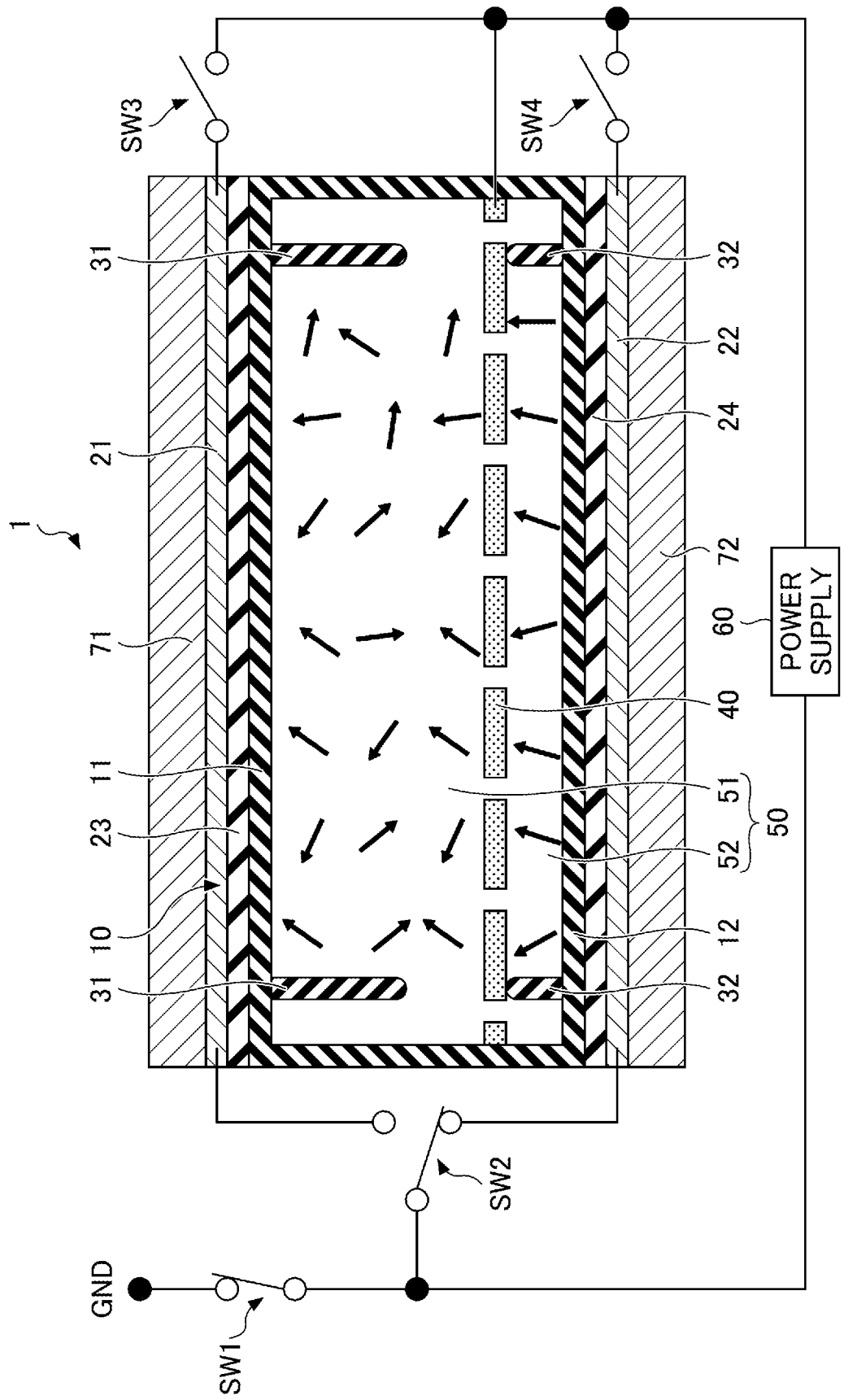
FIG. 11 is a first diagram illustrating a temperature control operation of the electrocaloric effect element according to the first embodiment.
Figure 12:
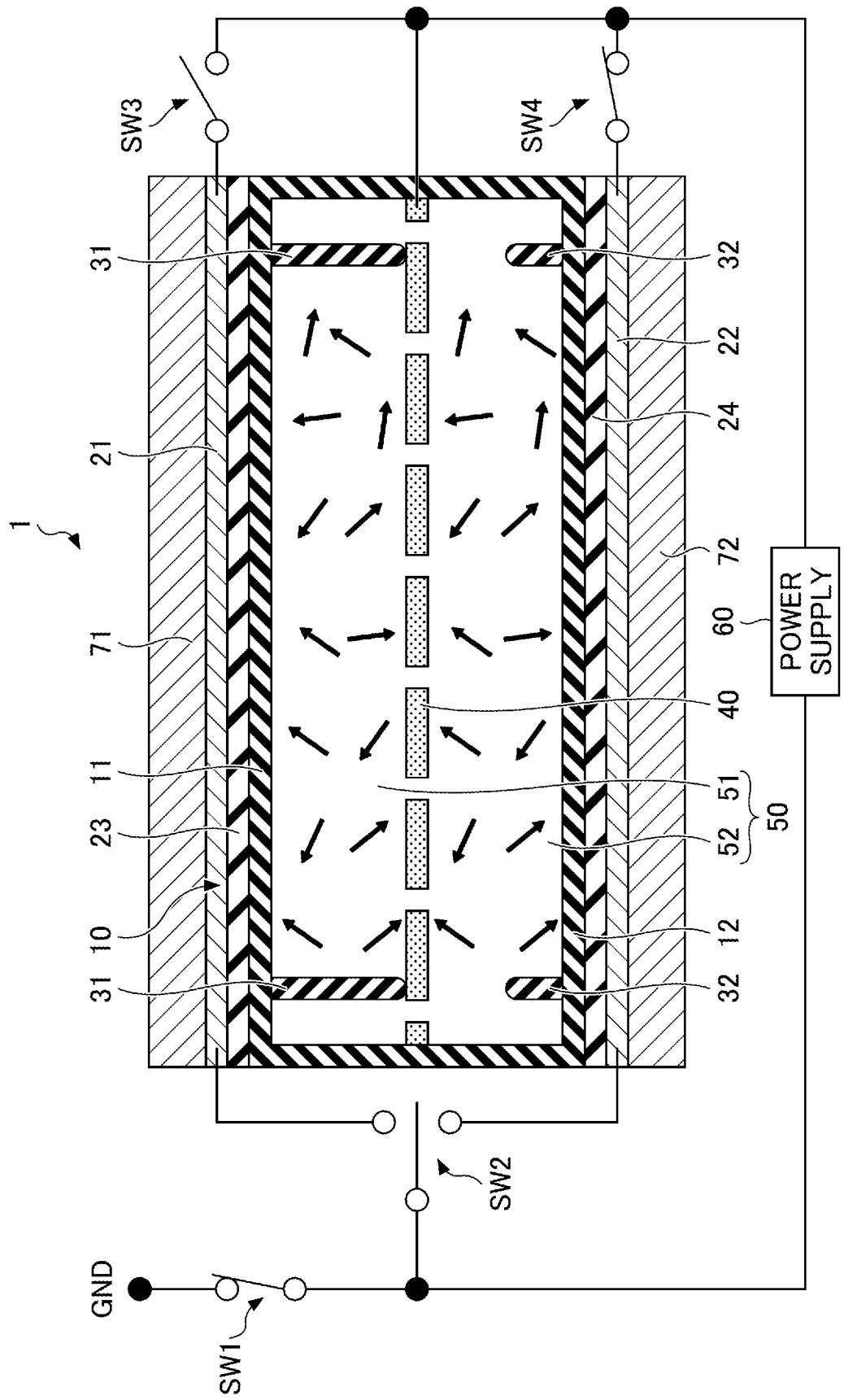
FIG. 12 is a second diagram illustrating the temperature control operation of the electrocaloric effect element according to the first embodiment.

Here, the electrocaloric effect element 1 can be used not only for simple cooling but also for cooling while controlling the temperature. FIGS. 11 and 12 are diagrams illustrating a temperature control operation of the electrocaloric effect element 1 according to the first embodiment. This operation is also achieved, for example, by a control mechanism, such as a computer, executing a control program. In FIGS. 11 and 12, the arrows in the ionic liquid 50 indicate the orientations of the cation-anion pairs.

First, as illustrated in FIG. 11, the switch SW1 is closed, the switches SW3 and SW4 are opened, and the switch SW2 is connected to the second electrode 22 side. Because the voltage of the power supply 60 is applied between the second electrode 22 and the movable electrode 40, an electric field having an electric field strength E of $E_1$ is applied between the second electrode 22 and the movable electrode 40, and the temperature T increases to $T_2$ in the second portion 52. Additionally, an attractive force acts between the second electrode 22 and the movable electrode 40, and the movable electrode 40 approaches the second electrode 22, contacts the second spacer 32, and stops. When the state of the switches SW1 to SW4 illustrated in FIG. 11 is maintained, as time passes, the orientations of the cation-anion pairs in the second portion 52 change such that the orientations are aligned with the direction of the electric field having an electric field strength E of $E_1$.

Subsequently, as illustrated in FIG. 12, the switches SW1 and SW4 are closed, and the switches SW2 and SW3 are opened. Because the identical electric potential is applied to the second electrode 22 and the movable electrode 40, the electric field strength E of the electric field between the second electrode 22 and the movable electrode 40 is 0. Additionally, a repulsion force acts between the second electrode 22 and the movable electrode 40, and the movable electrode 40 approaches the first electrode 21, contacts the first spacer 31, and stops. At this time, the ionic liquid 50 is agitated through the opening 40A.

As described above, the temperature control can be performed by using the electrocaloric effect element 1.

Second Embodiment

A second embodiment relates to an electrocaloric effect element suitable for heating. FIGS. 13 to 19 are diagrams illustrating a heating operation of an electrocaloric effect element 2 according to the second embodiment. This operation is also achieved, for example, by a control mechanism, such as a computer, executing a control program. In FIGS. 13 to 19, the arrows in the ionic liquid 50 indicate the orientations of the cation-anion pairs. As illustrated in FIGS. 13 to 19, the heat sink 71 to be heated is provided on the second electrode 22 side, and the heat source 72 is provided on the first electrode 21 side. Here, in the electrocaloric effect element 2 according to the second embodiment, the second spacer 32 is higher than the first spacer 31. The other configuration is substantially the same as that of the electrocaloric effect element 1 according to the first embodiment.

Figure 13:
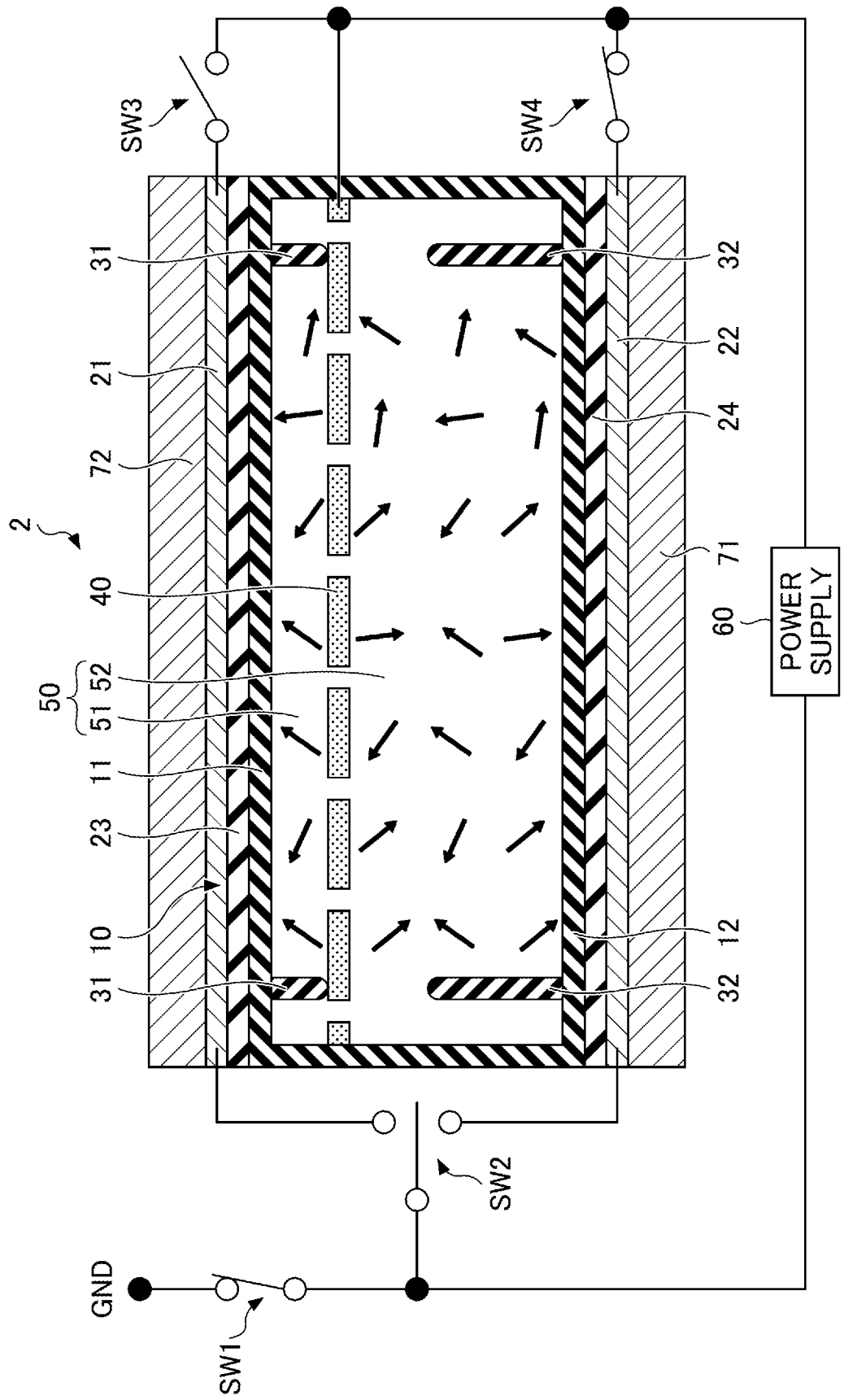
FIG. 13 is a first diagram illustrating a heating operation of an electrocaloric effect element according to a second embodiment.

First, as illustrated in FIG. 13, the switches SW1 and SW4 are closed, and the switches SW2 and SW3 are opened. Because the identical electric potential is applied to the second electrode 22 and the movable electrode 40, the electric field strength E of the electric field between the second electrode 22 and the movable electrode 40 is 0. Additionally, a repulsion force acts between the second electrode 22 and the movable electrode 40, and the movable electrode 40 approaches the first electrode 21, contacts the first spacer 31, and stops. The electric potential of the first electrode 21 is floating, and no electric field is applied between the first electrode 21 and the movable electrode 40.

In FIG. 13, all of the ionic liquid 50 is in the first state 101. That is, the entropy S is $S_1$ and the temperature T is $T_1$.

Figure 14:
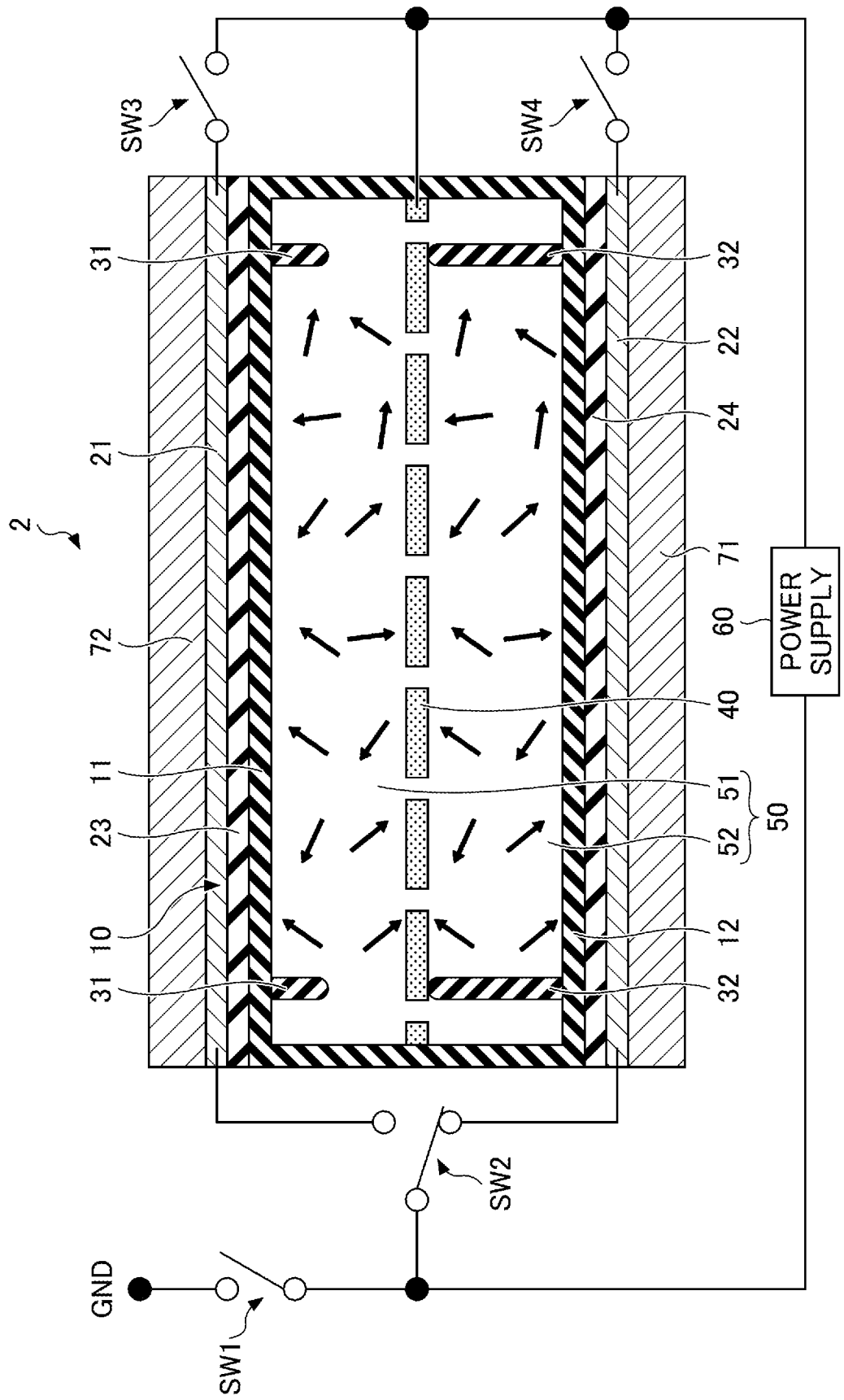
FIG. 14 is a second diagram illustrating the heating operation of the electrocaloric effect element according to the second embodiment.

Subsequently, as illustrated in FIG. 14, the switches SW1, SW3, and SW4 are opened, and the switch SW2 is connected to the second electrode 22 side. Because the voltage of the power supply 60 is applied between the second electrode 22 and the movable electrode 40, an electric field having an electric field strength E of $E_1$ is applied between the second electrode 22 and the movable electrode 40. Additionally, an attractive force acts between the second electrode 22 and the movable electrode 40, the movable electrode 40 approaches the second electrode 22, contacts the second spacer 32, and stops. At this time, the ionic liquid 50 is agitated through the opening 40A. Thus, the heat transferred from the heat source 72 to the ionic liquid 50 is transferred from the ionic liquid 50 to the heat sink 71 and supplied to the heat sink 71. The second portion 52 between the movable electrode 40 and the second electrode 22 in the ionic liquid 50 is in the second state 102. That is, the entropy S remains $S_1$ and the temperature T increases to $T_2$. In contrast, the first portion 51 between the movable electrode 40 and the first electrode 21 in the ionic liquid 50 remains in the first state 101.

Figure 15:
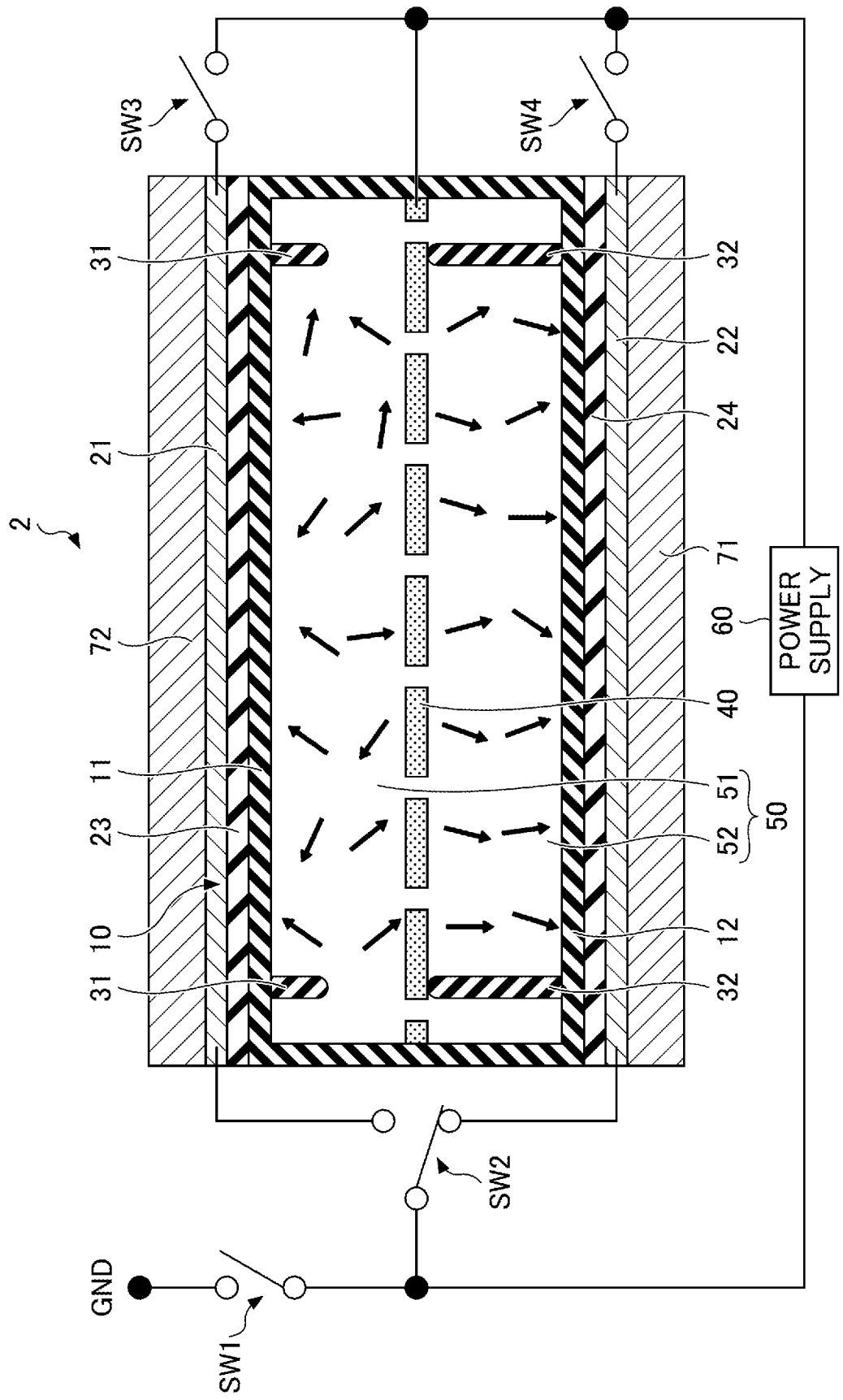
FIG. 15 is a third diagram illustrating the heating operation of the electrocaloric effect element according to the second embodiment.

When the state of the switches SW1 to SW4 illustrated in FIG. 14 is maintained, as illustrated in FIG. 15, as time passes, the orientations of the cation-anion pairs change in the second portion 52 such that the orientations are aligned with the direction of the electric field having an electric field strength E of $E_1$. That is, the second portion 52 changes from the second state 102 to the third state 103. At this time, the entropy S decreases from $S_1$ to $S_3$, and the temperature T decreases from $T_2$ to $T_3$. Therefore, the heat is supplied from the second portion 52 to the heat sink 71. Additionally, the first portion 51 remains in the first state 101, but as the temperature of the second portion 52 decreases, the temperature difference between the second portion 52 and the heat source 72 increases, and the heat of the heat source 72 is transferred to the second portion 52 through the first portion 51.

Figure 16:
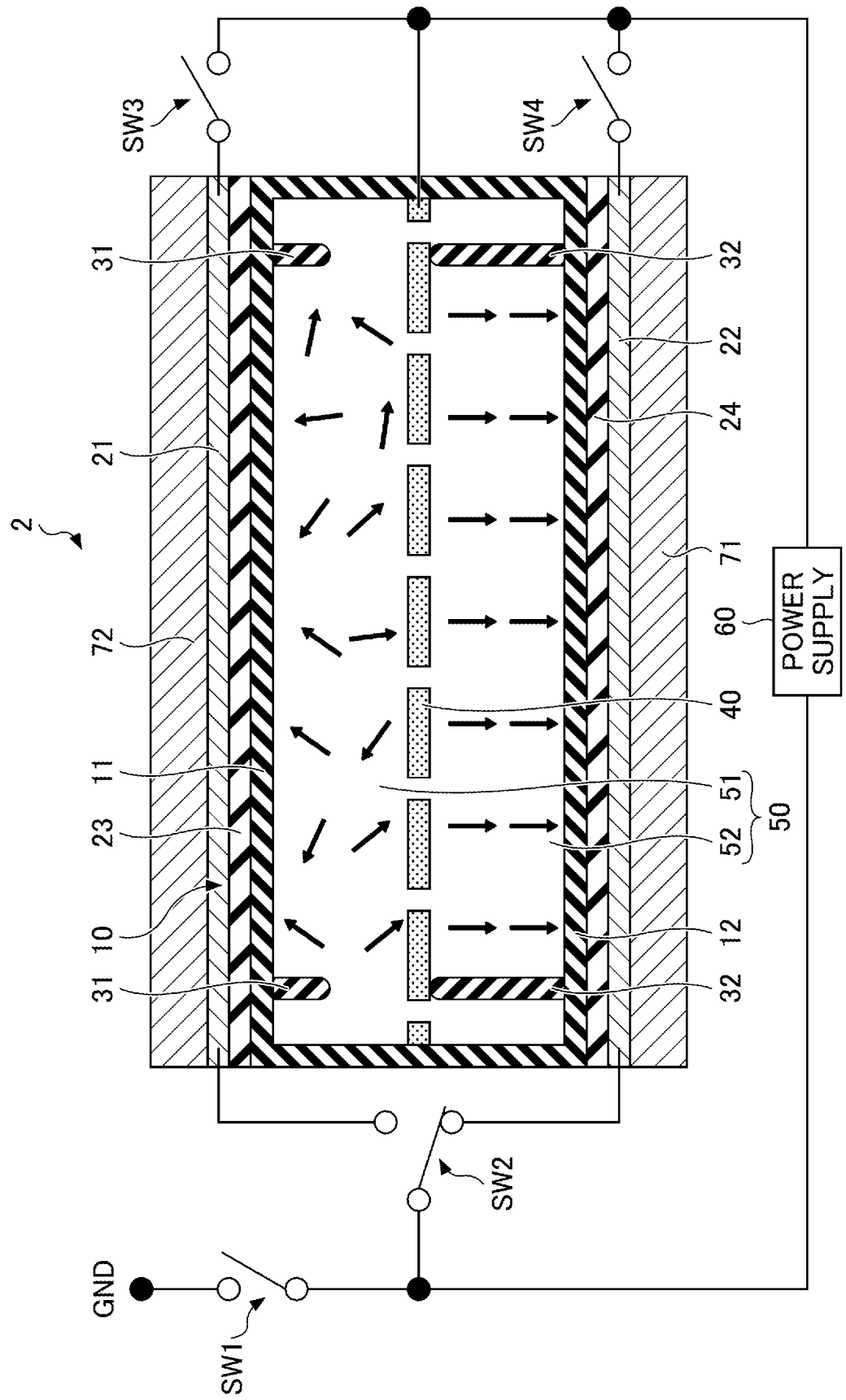
FIG. 16 is a fourth diagram illustrating the heating operation of the electrocaloric effect element according to the second embodiment.

As time passes further, as illustrated in FIG. 16, the orientations of the cation-anion pairs are aligned in one direction in the second portion 52 and the second portion 52 reaches the fourth state 104. In the second portion 52, the entropy S reaches $S_3$ and the temperature T reaches $T_3$. The first portion 51 remains in the first state 101, but as the temperature of the second portion 52 decreases, the temperature difference between the second portion 52 and the heat source 72 increases, and the heat of the heat source 72 is transferred to the second portion 52 through the first portion 51.

Figure 17:
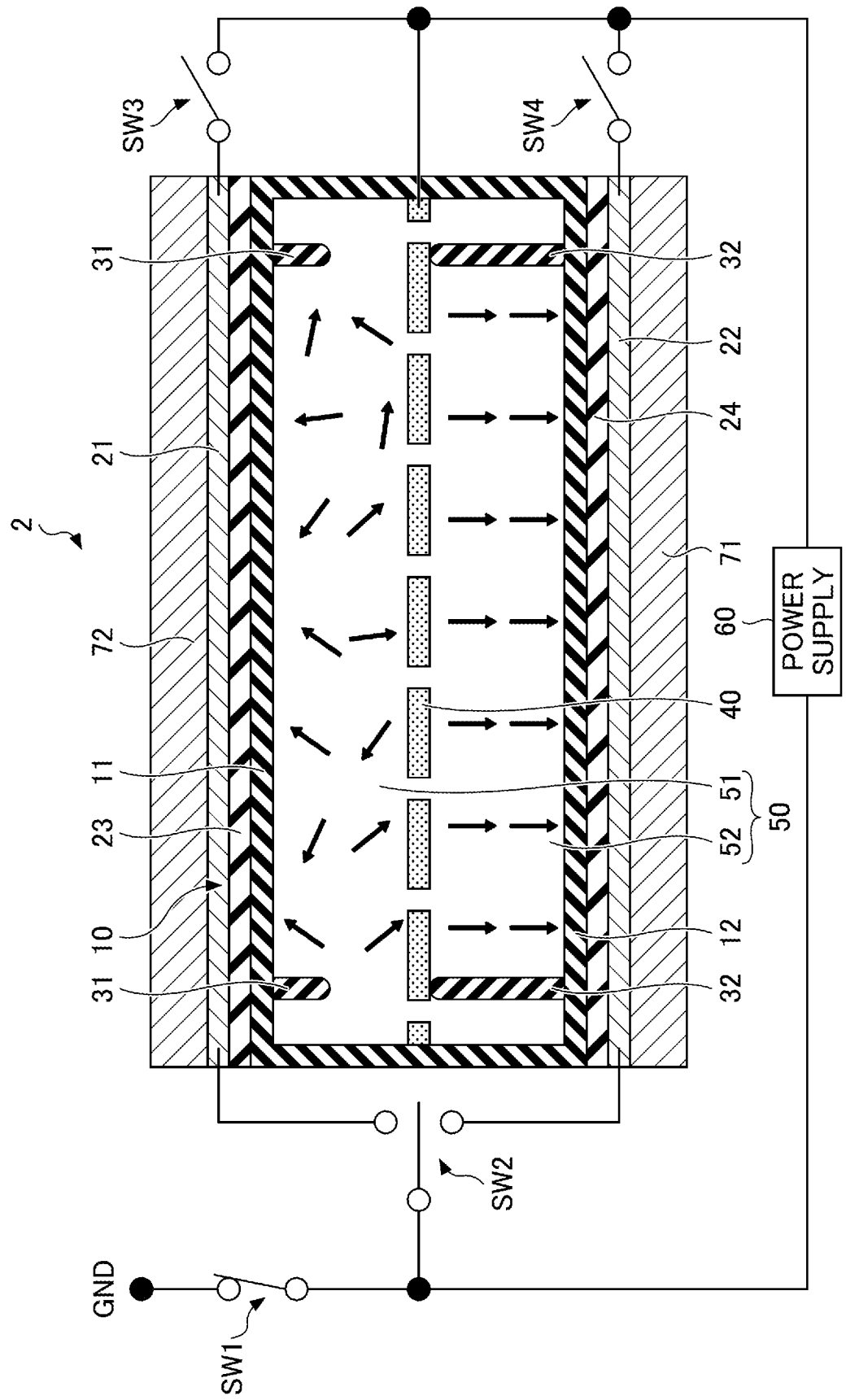
FIG. 17 is a fifth diagram illustrating the heating operation of the electrocaloric effect element according to the second embodiment.

Subsequently, as illustrated in FIG. 17, the switch SW1 is closed, and the switches SW2, SW3, and SW4 are opened. Because the electric potentials of the first electrode 21, the second electrode 22, and the movable electrode 40 are floating, the electric field strength E of the electric field between the first electrode 21 and the movable electrode 40 and the electric field strength E between the second electrode 22 and the movable electrode 40 are both 0. The second portion 52 is in the fourth state 104. That is, the entropy S remains $S_3$ and the temperature T decreases to $T_4$. The first portion 51 remains in the first state 101, but the heat of the heat source 72 is transferred to the second portion 52 through the first portion 51.

Figure 18:
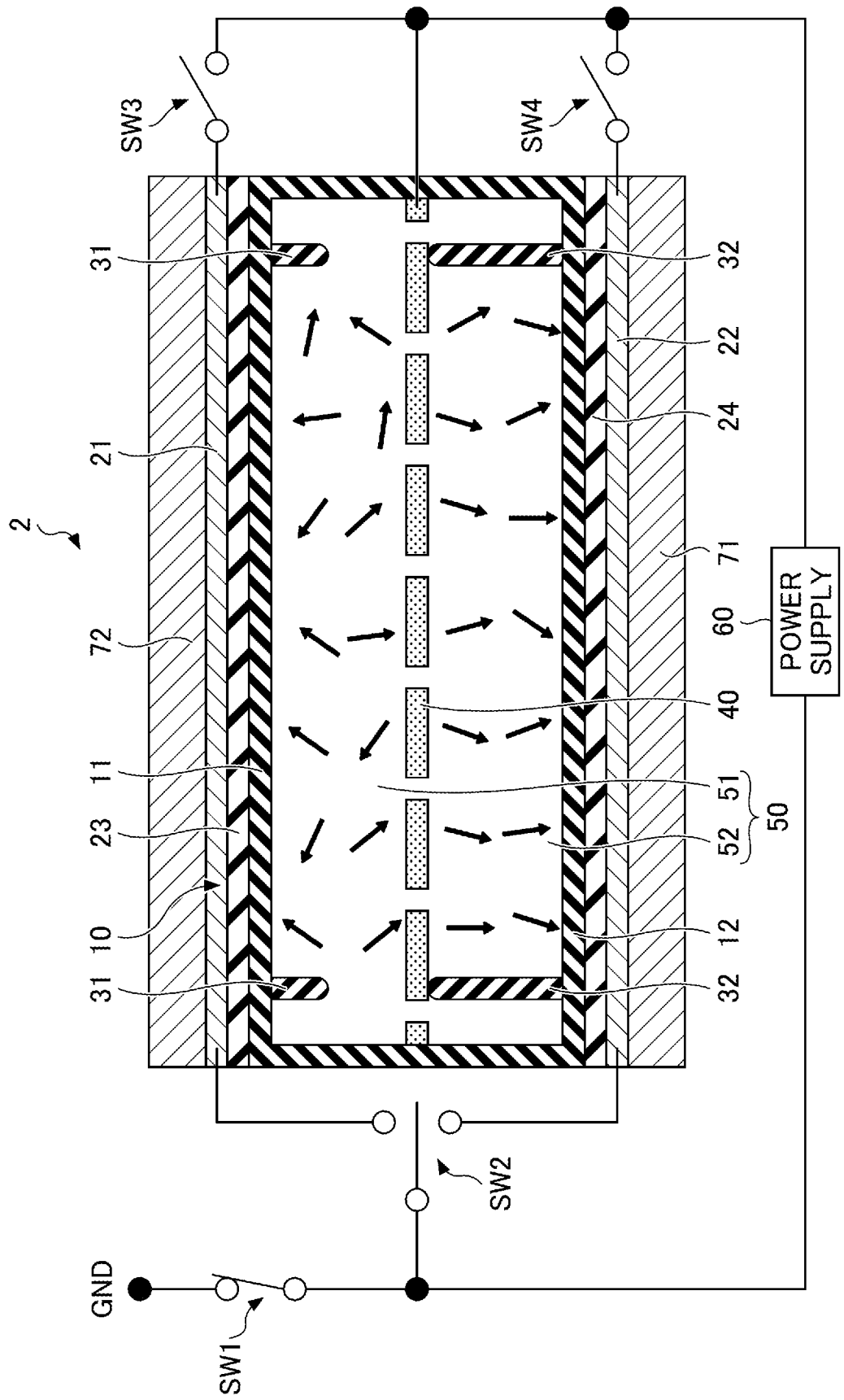
FIG. 18 is a sixth diagram illustrating the heating operation of the electrocaloric effect element according to the second embodiment.

When the state of the switches SW1 to SW4 illustrated in FIG. 17 is maintained, as illustrated in FIG. 18, as time passes, the second portion 52 absorbs the heat from the first portion 51 and, in the second portion 52, the orientations of the cation-anion pairs change to be randomly aligned. That is, the second portion 52 changes from the fourth state 104 to the first state 101. At this time, the entropy S increases from $S_3$ to $S_1$, and the temperature T increases from $T_4$ to $T_1$. The first portion 51 remains in the first state 101, but absorbs the heat from the heat source 72 because the heat is absorbed by the second portion 52.

As time passes further, the orientations of the cation-anion pairs become randomly aligned in the second portion 52, and the second portion 52 reaches the first state 101. In the second portion 52, the entropy S reaches $S_1$ and the temperature T reaches $T_1$. The first portion 51 remains in the first state 101, but the heat of the heat source 72 is transferred to the second portion 52 through the first portion 51.

Figure 19:
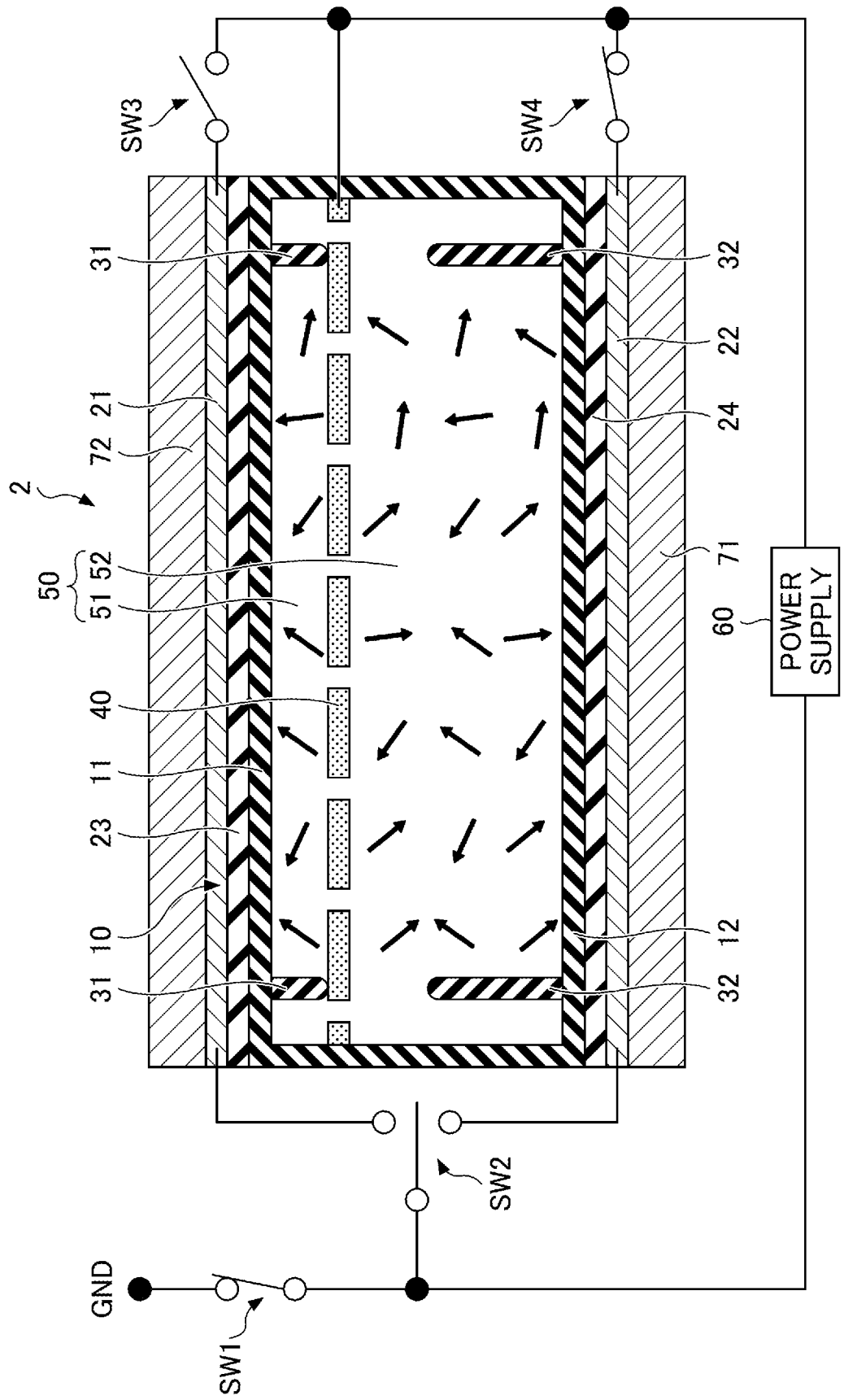
FIG. 19 is a seventh diagram illustrating the heating operation of the electrocaloric effect element according to the second embodiment.

Subsequently, as illustrated in FIG. 19, the switches SW1 and SW4 are closed, and the switches SW2 and SW3 are opened. Because the identical electric potential is applied to the second electrode 22 and the movable electrode 40, the electric field strength E of the electric field between the second electrode 22 and the movable electrode 40 is 0. Additionally, a repulsion force acts between the second electrode 22 and the movable electrode 40, and the movable electrode 40 approaches the first electrode 21, contacts the first spacer 31, and stops. At this time, the ionic liquid 50 is agitated through the opening 40A. Therefore, the heat transferred from the heat source 72 to the ionic liquid 50 is transferred from the ionic liquid 50 to the heat sink 71. As described, the state is returned to the state illustrated in FIG. 13.

As these cycles are repeated, the heat absorbed by the heat source 72 is supplied to the heat sink 71 by the electrocaloric effect element 1.

According to the second embodiment, the heat sink 71 can be heated efficiently.

Figure 20:
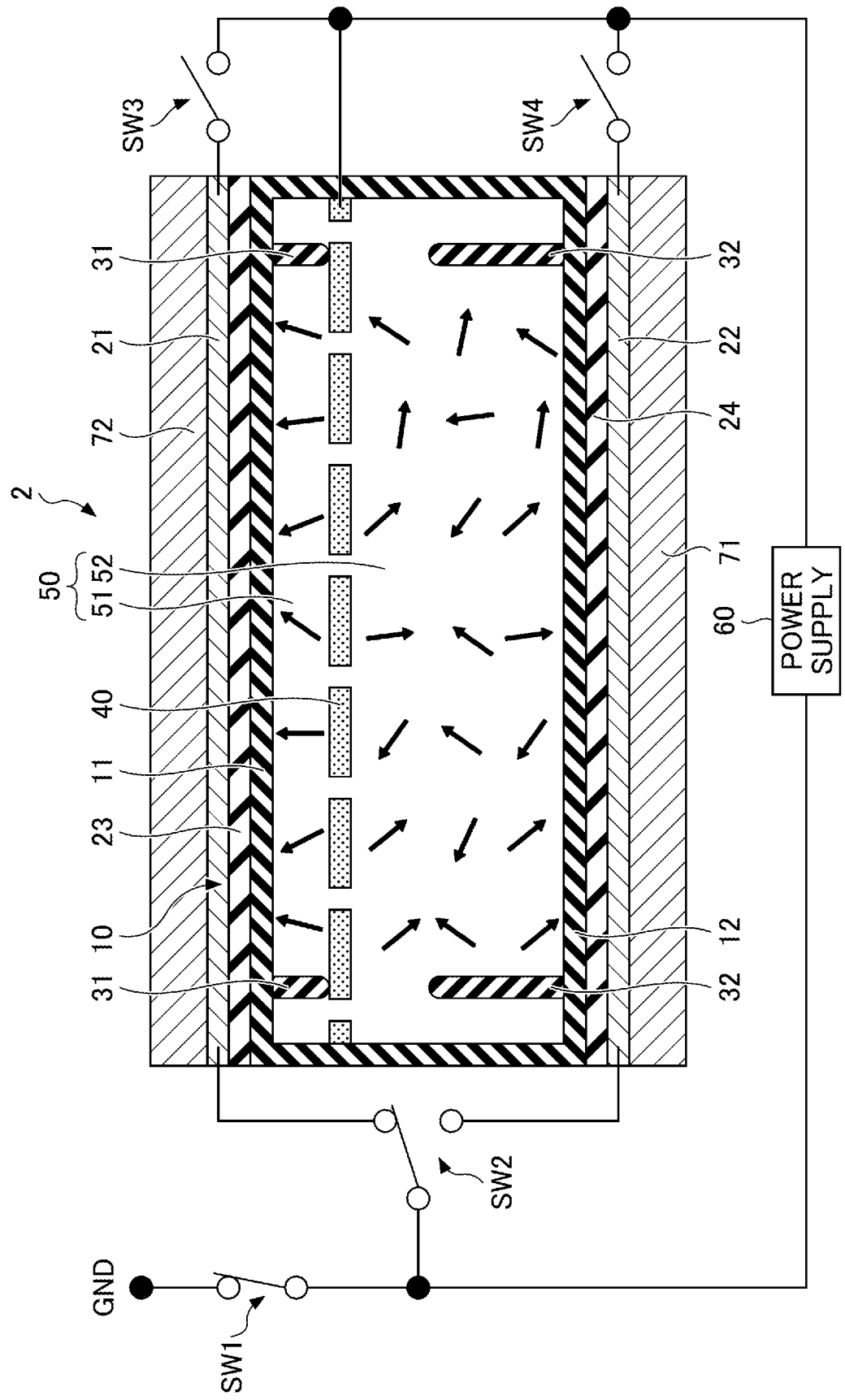
FIG. 20 is a first diagram illustrating a temperature control operation of the electrocaloric effect element according to the second embodiment.
Figure 21:
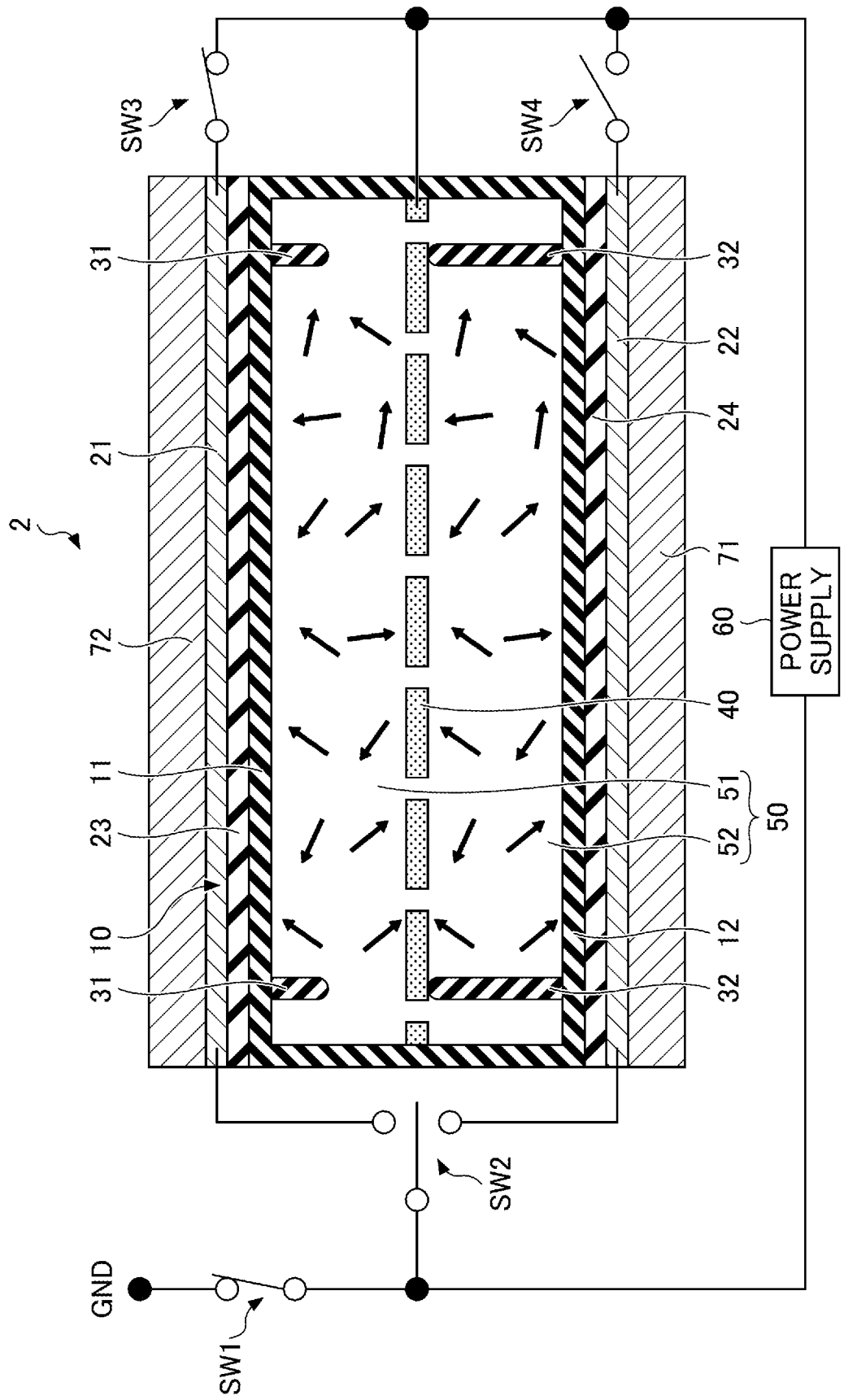
FIG. 21 is a second diagram illustrating the temperature control operation of the electrocaloric effect element according to the second embodiment.

Here, the electrocaloric effect element 2 can be used not only for simple heating but also for heating while controlling the temperature. FIGS. 20 and 21 are diagrams illustrating the temperature control operation of the electrocaloric effect element 2 according to the second embodiment. This operation is also achieved, for example, by a control mechanism, such as a computer, executing a control program. In FIGS. 20 and 21, the arrows in the ionic liquid 50 indicate the orientations of the cation-anion pairs.

First, as illustrated in FIG. 20, the switch SW1 is closed, the switches SW3 and SW4 are opened, and the switch SW2 is connected to the first electrode 21 side. Because the voltage of the power supply 60 is applied between the first electrode 21 and the movable electrode 40, an electric field having an electric field strength E of E1 is applied between the first electrode 21 and the movable electrode 40, and the temperature T increases to T2 in the first portion 51. Additionally, an attractive force acts between the first electrode 21 and the movable electrode 40, and the movable electrode 40 approaches the first electrode 21, contacts the first spacer 31, and stops. When the state of the switches SW1 to SW4 illustrated in FIG. 20 is maintained, as time passes, the orientations of the cation-anion pairs in the first portion 51 change such that the orientations are aligned with the direction of the electric field having an electric field strength E of E1.

Subsequently, as illustrated in FIG. 21, the switches SW1 and SW3 are closed, and the switches SW2 and SW4 are opened. Because the identical electric potential is applied to the first electrode 21 and the movable electrode 40, the electric field strength E of the electric field between the first electrode 21 and the movable electrode 40 is 0. Additionally, a repulsion force acts between the first electrode 21 and the movable electrode 40, and the movable electrode 40 approaches the second electrode 22, contacts the second spacer 32, and stops. At this time, the ionic liquid 50 is agitated through the opening 40A.

As described, the temperature control can be performed by using the electrocaloric effect element 2.

Figure 22:
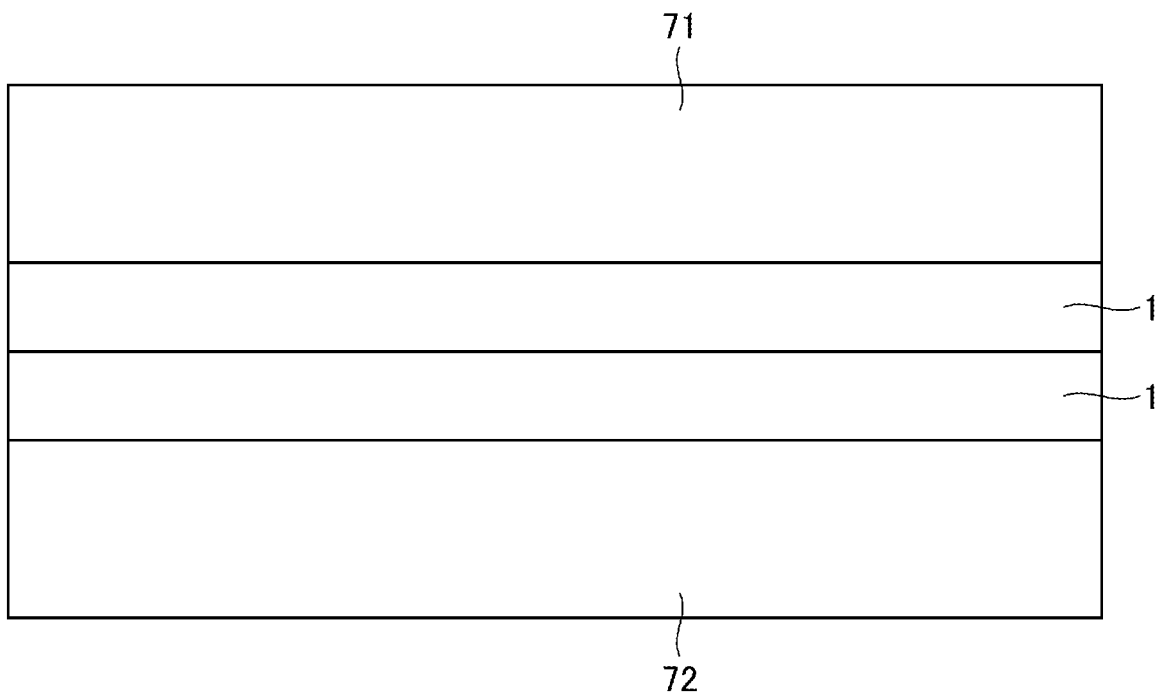
FIG. 22 is a diagram illustrating an example of a usage form of the electrocaloric effect element.

Here, as illustrated in FIG. 22, two electrocaloric effect elements 1 may be provided in series between the heat sink 71 and the heat source 72. That is, a heat transfer device having two electrocaloric effect elements 1 stacked together may be configured. In this heat transfer device, the first wall 11 of one container 10 faces the second wall 12 of the other container 10 between two electrocaloric effect elements 1 adjacent in a stacking direction. In this case, the efficiency of the heat transfer can be further improved by shifting the operating cycles between the two electrocaloric effect elements 1 by half a period. Three or more electrocaloric effect elements 1 may be provided in series between the heat sink 71 and the heat source 72. Similarly, two or more electrocaloric effect elements 2 may be provided in series between the heat sink 71 and the heat source 72.

Additionally, multiple electrocaloric effect elements 1 or 2 may also be provided in parallel between the heat sink 71 and the heat source 72. In this case, the heat transfer can be performed over a wide range by synchronizing the operating cycles of the electrocaloric effect elements 1 or 2.

In the present disclosure, the shapes of the first electrode and the second electrode are not limited. For example, the first electrode and the second electrode may have a tubular shape. In this case, for example, one can be an outer tube and the other can be an inner tube, and heat exchange fluid can be caused to flow through the inner tube.

The electrocaloric effect element according to the present disclosure can be used in a semiconductor manufacturing device. For example, a wafer chuck of a semiconductor manufacturing device may be provided with an electrocaloric effect element so that the temperature of a wafer held in the wafer chuck can be controlled. The electrocaloric effect element may be used to control the temperature of the transfer device that transfers the wafer. The electrocaloric effect element may be used to control the temperature of a chemical solution used for etching or the like. The electrocaloric effect element may be used to control the temperature of gas used to process the wafer.

The electrocaloric effect element according to the present disclosure can also be used to cool electronic devices, such as smartphones and tablet terminals. The electrocaloric effect element can also be used for heating and cooling in constructions, such as homes, buildings, and the like.

Although the preferred embodiments have been described in detail above, various modifications and substitutions can be made to the above-described embodiments without being limited by the above-described embodiments and departing from the scope of the claims.

This application is based on and claims priority to Japanese Patent Application No. 2020-142661, filed on Aug. 26, 2020, and the entire contents of which are incorporated herein by reference.

DESCRIPTION OF REFERENCE SYMBOLS 1, 2 electrocaloric effect element
10 container
11, 12 wall
21, 22 electrode
23, 24 insulating film
31, 32 spacer 40 movable electrode
40A opening
41 base material
41A opening
42 insulating film
50 ionic liquid
71 heat sink
72 heat source

What is claimed is:

1. An electrocaloric effect element comprising:
    a container having a first wall and a second wall, the second wall facing the first wall;
    ionic liquid accommodated in the container;
    a first electrode provided at an outer surface of the first wall; and
    a movable electrode provided in the ionic liquid such that the movable electrode is movable in the ionic liquid.

2. The electrocaloric effect element as claimed in claim 1, further comprising a second electrode provided at an outer surface of the second wall.

3. The electrocaloric effect element as claimed in claim 2, further comprising:
    a first switch, one end of the first switch being connected to a reference voltage;
    a second switch, one end of the second switch being connected to another end of the first switch, and the second switch being configured to switch to connect another end of the second switch to the first electrode, to connect the another end of the second switch to the second electrode, and to be floating;
    a power supply, one end of the power supply being connected to the another end of the first switch and to the one end of the second switch, and another end of the power supply being connected to the movable electrode;
    a third switch connected between the another end of the power supply and the first electrode;
    a fourth switch connected between the another end of the power supply and the second electrode; and
    a control mechanism configured to cause the third switch to open upon the another end of the second switch being connected to the first electrode, and cause the fourth switch to open upon the another end of the second switch being connected to the second electrode.

4. The electrocaloric effect element as claimed in claim 1, wherein the container is an insulating container.

5. The electrocaloric effect element as claimed in claim 1, wherein the first electrode includes a conductive oxide.

6. The electrocaloric effect element as claimed in claim 1, further comprising a first insulating film provided between the first wall and the first electrode.

7. The electrocaloric effect element as claimed in claim 6, wherein the first insulating film includes silicon oxide, aluminum oxide, silicon nitride, zirconium oxide, hafnium oxide, titanium oxide, strontium titanate, barium titanate, lead zirconate titanate, or calcium copper titanate.

8. The electrocaloric effect element as claimed in claim 1, wherein the movable electrode is disposed parallel to the first electrode.

9. The electrocaloric effect element as claimed in claim 2, wherein the second electrode includes a conductive oxide.

10. The electrocaloric effect element as claimed in claim 2, further comprising a second insulating film provided between the second wall and the second electrode.

11. The electrocaloric effect element as claimed in claim 10, wherein the second insulating film includes silicon oxide, aluminum oxide, silicon nitride, zirconium oxide, hafnium oxide, titanium oxide, strontium titanate, barium titanate, lead zirconate titanate, or calcium copper titanate.

12. The electrocaloric effect element as claimed in claim 2, wherein the second electrode is disposed parallel to the first electrode.

13. The electrocaloric effect element as claimed in claim 2, wherein a distance between the first electrode and the second electrode is less than or equal to 100 μm.

14. A transfer device comprising a plurality of electrocaloric effect elements as claimed in claim 1, the plurality of electrocaloric effect elements being stacked together, wherein the first wall of one container faces the second wall of another container between electrocaloric effect elements adjacent in a stacking direction among the plurality of electrocaloric effect elements.

15. A semiconductor manufacturing device comprising the electrocaloric effect element as claimed in claim 1.

16. A method of controlling an electrocaloric effect element to cause a temperature on a first wall side to be less than a temperature on a second wall side, the electrocaloric effect element including:
    a container having a first wall and a second wall, the second wall facing the first wall;
    ionic liquid accommodated in the container;
    a first electrode provided at an outer surface of the first wall;
    a second electrode provided at an outer surface of the second wall;
    a movable electrode provided in the ionic liquid such that the movable electrode is movable in the ionic liquid;
    a first switch, one end of the first switch being connected to a reference voltage;
    a second switch, one end of the second switch being connected to another end of the first switch, and the second switch being configured to switch to connect another end of the second switch to the first electrode, to connect the another end of the second switch to the second electrode, and to be floating;
    a power supply, one end of the power supply being connected to the another end of the first switch and to the one end of the second switch, and another end of the power supply being connected to the movable electrode;
    a third switch connected between the another end of the power supply and the first electrode; and
    a fourth switch connected between the another end of the power supply and the second electrode, the method comprising:
    setting a temperature of the ionic liquid to a first temperature, causing the first switch and the third switch to close, causing the second switch to be floating, and causing the fourth switch to open;
    causing the first switch, the third switch, and the fourth switch to open and connecting the another end of the second switch to the first electrode;
    maintaining a state in which the first switch, the third switch, and the fourth switch are opened and the another end of the second switch is connected to the first electrode;
    causing the first switch to close, causing the second switch to be floating, and causing the third switch and the fourth switch to open; and
    maintaining a state in which the first switch is closed, the second switch is floating, and the third switch and the fourth switch are opened.

17. A method of controlling an electrocaloric effect element to cause a temperature on a first wall side to be greater than a temperature on a second wall side, the electrocaloric effect element including:
- a container having a first wall and a second wall, the second wall facing the first wall;
- ionic liquid accommodated in the container;
- a first electrode provided at an outer surface of the first wall;
- a second electrode provided at an outer surface of the second wall;
- a movable electrode provided in the ionic liquid such that the movable electrode is movable in the ionic liquid;
- a first switch, one end of the first switch being connected to a reference voltage;
- a second switch, one end of the second switch being connected to another end of the first switch, and the second switch being configured to switch to connect another end of the second switch to the first electrode, to connect the another end of the second switch to the second electrode, and to be floating;
- a power supply, one end of the power supply being connected to the another end of the first switch and to the one end of the second switch, and another end of the power supply being connected to the movable electrode;
- a third switch connected between the another end of the power supply and the first electrode; and
- a fourth switch connected between the another end of the power supply and the second electrode, the method comprising:

setting a temperature of the ionic liquid to a first temperature, causing the first switch and the fourth switch to close, causing the second switch to be floating, and causing the third switch to open;

causing the first switch, the third switch, and the fourth switch to open and connecting the another end of the second switch to the second electrode;

maintaining a state in which the first switch, the third switch, and the fourth switch are opened and the another end of the second switch is connected to the second electrode;

causing the first switch to close, causing the second switch to be floating, and causing the third switch and the fourth switch to open; and maintaining a state in which the first switch is closed, the second switch is floating, and the third switch and the fourth switch are opened.

* * * * *